US012436741B2

(12) United States Patent
Laubrock et al.

(10) Patent No.: US 12,436,741 B2
(45) Date of Patent: Oct. 7, 2025

(54) CAR PROCESSOR WITH PQC ENCRYPTION SUPPORT

(71) Applicant: ELMOS Semiconductor SE, Dortmund (DE)

(72) Inventors: Jan Laubrock, Rhede (DE); Thomas Rotter, Neunkirchen am Brand (DE); Julia Kölbel, Dortmund (DE); Christian Lammers, Dülmen-Rorup (DE)

(73) Assignee: ELMOS Semiconductor SE, Dortmund (DE)

( * ) Notice: Subject to any disclaimer, the term of this patent is extended or adjusted under 35 U.S.C. 154(b) by 15 days.

(21) Appl. No.: 18/702,318

(22) PCT Filed: Oct. 25, 2022

(86) PCT No.: PCT/EP2022/079826
§ 371 (c)(1),
(2) Date: Apr. 17, 2024

(87) PCT Pub. No.: WO2023/072956
PCT Pub. Date: May 4, 2023

(65) Prior Publication Data
US 2024/0411902 A1    Dec. 12, 2024

(30) Foreign Application Priority Data

Oct. 27, 2021  (DE) ............... 10 2021 128 005.2
Nov. 18, 2021  (DE) ............... 10 2021 130 107.6
(Continued)

(51) Int. Cl.
G06F 7/58         (2006.01)
(52) U.S. Cl.
CPC ................. *G06F 7/588* (2013.01)

(58) Field of Classification Search
CPC ........................................ G06F 7/58–588
See application file for complete search history.

(56) References Cited

U.S. PATENT DOCUMENTS 10,802,800 B1   10/2020  Vakili
2013/0193546 A1  8/2013  Webster et al.
2014/0136583 A1*  5/2014  Hyde ............... G06F 7/588
                                                708/250

FOREIGN PATENT DOCUMENTS

EP         1490772 B1    12/2004
KR    1020210087127 A     7/2021
(Continued)

OTHER PUBLICATIONS

Massari et al. in "Towards low-cost monolithic QRNGs" on Proceedings vol. 12133, Quantum Technologies 2022; 1213308, May 2022, https://doi.org/10.1117/12.2621617 (Year: 2022).*
(Continued)

*Primary Examiner* — Carlo Waje
(74) *Attorney, Agent, or Firm* — Mindful IP PLLC; Michael J. McCandlish

(57) ABSTRACT

A secure microcontroller for controlling devices in automobiles comprises a semiconductor substrate, memory elements, at least one internal bus, at least one 8/16/32/64-bit microcontroller core, one or more data interfaces and at least one quantum process-based generator for true random numbers. The memory elements, the data interface, the quantum process-based generator and the microcontroller core are connected to the internal bus. The quantum process-based generator generates and provides a random number at the request of the microcontroller core. The microcontroller core generates a key using a program from one or more of its memory elements and the random number. The microcontroller core uses a program from one or more of its memory elements and the key to encrypt and decrypt data
(Continued)

which it exchanges with devices external to the secure microcontroller. The semiconductor substrate integrally comprises the sub-devices of the secure microcontroller mentioned herein.

23 Claims, 10 Drawing Sheets

(30) Foreign Application Priority Data

| | | |
|---|---|---|
| May 2, 2022 | (DE) | 10 2022 110 713.2 |
| Oct. 4, 2022 | (DE) | 10 2022 125 574.3 |
| Oct. 5, 2022 | (DE) | 10 2022 125 617.0 |
| Oct. 6, 2022 | (DE) | 10 2022 125 768.1 |

(56) References Cited

FOREIGN PATENT DOCUMENTS

| | | |
|---|---|---|
| WO | 2005013549 A1 | 2/2005 |
| WO | 2017064027 | 4/2017 |

OTHER PUBLICATIONS

Acerbi et al. in "A Robust Quantum Random Number Generator Based on an Integrated Emitter-Photodetector Structure," in IEEE Journal of Selected Topics in Quantum Electronics, vol. 24, No. 6, pp. 1-7, Nov.-Dec. 2018, Art No. 6101107, doi: 10.1109/JSTQE.2018.2814787. (Year: 2018).*

Acerbi et al. "Structures and Methods for Fully-Integrated Quantum Random Number Generators," in IEEE Journal of Selected Topics in Quantum Electronics, vol. 26, No. 3, pp. 1-8, May-Jun. 2020, Art No. 9200116, doi: 10.1109/JSTQE.2020.2990216. (Year: 2020).*

International Preliminary Report on Patentability issued in corresponding international application PCT/EP2022/079826 on Jan. 2, 2024.

Khanmohammadi Abbas, Enne Reinhard, Hofbauer Michael, Zimmermanna Horst—A Monolithic Silicon Quantum Random Number Generator Based on Measurement of Photon Detection Time; vol. 7, No. 5, Oct. 2015 IEEE Photonics Society Oct. 1, 2015.

SPADs for quantum random number generators and beyond; Samuel Burri; Damien Stucki; Yuki Maruyama; Claudio Bruschini; Edoardo Charbon; Francesco Regazzoni 2014 19th Asia and South Pacific Design Automation Conference (ASP-DAC).

Tisa Simone et al.; "High-speed Quantum Random Number Generation Using CMOS Photon Counting Detectors," IEEE Journal of Selected Topics in Quantum Electronics, IEEE, USA, vol. 21, No. 3, May 1, 2015 (May 1, 2015), pp. 1-7, XP011569061, ISSN:1077-260X, DOI: 10.1109/JSTQE.2014.2375132 [retrieved on Jan. 5, 2015].

Office Action issued Nov. 12, 2025, in correlated Korean application 10-2024-7014870, with translation.

* cited by examiner

US 12,436,741 B2

CAR PROCESSOR WITH PQC ENCRYPTION SUPPORT

CROSS-REFERENCE TO RELATED APPLICATIONS

This application is a US National Phase of International Patent Application Number PCT/EP2022/079826, filed on Oct. 25, 2022, claiming priority to the German Patent Applications 10 2021 128 005.2 of 27 Oct. 2021, DE 10 2021 130 107.6 of 18 Nov. 2021, DE 10 2022 110 713.2 of 2 May 2022, DE 10 2022 125 574.3 of 4 Oct. 2022, DE 10 2022 125 617.0 of 5 Oct. 2022 and DE 10 2022 125 768.1 of 6 Oct. 2022, the contents of each of which are hereby incorporated into the subject matter of the present application by reference.

TECHNICAL FIELD

The disclosure relates to a microcontroller comprising, inter alia, at least one quantum process-based generator for true random numbers (Quantum Random Number Generator: QRNG) as a random number generator, which is applied, for example, for encryption.

BACKGROUND

The automotive industry and other branches of industry are increasingly exposed to a wide variety of piracy attacks. The counterfeiters copy the spare parts and products of the industrial manufacturers concerned and generally use their brand names. Hacker attacks, e.g. affecting the transmission of data within the products or to and from the product, such as in car-to-car or car-to-x communication or in data communication within the components of a vehicle, are a further risk, which is particularly relevant in autonomous systems and in data communication from outside with such autonomous systems and from these to outside with regard to protection against hacker attacks.

The entropy properties of currently used random number generators for data encryption in such systems are mostly insufficient. Quantum process-based generators for true random numbers (Quantum Random Number Generator: QRNG) are known in prior art, but they are difficult to integrate or have a poor quantum yield.

Details of data and signal processing units with microcontrollers and quantum process-based generators for the generation of random numbers are described, for example, in U.S. Pat. No. 10,802,800
Session key. In: Wikipedia, the free encyclopedia. Editing status: 1 Oct. 2020. URL: www.wikipedia.org [accessed on 31 May 2022];
Integrated circuit. In: Wikipedia, the free encyclopedia. Editing status: 12 Oct. 2021. URL: www.wikipedia.org [accessed on 31 May 2022];
BIOS. In: Wikipedia, the free encyclopedia. Editing status: 24 Oct. 2021. URL: www.wikipedia.org [accessed on 31 May 2022];
BURRI, S. [et al.]: SPADs for Quantum Random Number Generators and beyond. In: 19$^{th}$ Asia and South Pacific Design Automation Conference (ASP-DAC), 20-23 Jan. 2014, Singapore, IEEE, p. 788-794. DOI: 10.1109/ASP-DAC.2014.6742986;
Fabio Acerbi, Nicola Massari, Leonardo Gasparini, Alessandro Tomasi, Nicola Zorzi, Giorgio Fontana, Lorenzo Pavesi, Alberto Gola in "Structures and Methods for fully-integrated Quantum Random Number Generators", IEEE Journal of selected topics in quantum electronics, Vol. 26, No. 3, May/June 2020.

SUMMARY

The object of the disclosure is to provide a device and a method for generating true random numbers on the basis of optical quantum processes.

The object is achieved with the disclosure proposing a microcontroller for controlling devices in automobiles, wherein the microcontroller is provided with
  a semiconductor substrate,
  memory elements,
    at least one internal bus,
    at least one microcontroller core,
    one or more data interfaces, and
    at least one quantum process-based generator for true random numbers,
  wherein the memory elements are connected to the internal bus,
  wherein the data interface is connected to the internal bus,
  wherein the quantum process-based generator is connected to the internal bus, and
  wherein the microcontroller core is connected to the internal bus,
  wherein the quantum process-based generator generates a random number, optionally at the request of the microcontroller core,
  wherein the quantum process-based generator provides said random number,
  wherein the microcontroller core generates a key using of a program from one or more of its memory elements and using the random number,
  wherein the microcontroller core uses a program from one or more of its memory elements and the key to encrypt and decrypt data which it exchanges with external devices or internally via the data interface,
  wherein the semiconductor substrate integrally comprises the sub-devices of the secure microcontroller mentioned herein,
  wherein the quantum process-based generator comprises at least one first SPAD diode as a light source for an optical quantum signal,
  wherein the quantum process-based generator comprises the at least one second SPAD diode as a photodetector for receiving the optical quantum signal,
  wherein the quantum process-based generator comprises the at least one processing circuit,
  wherein the quantum process-based generator comprises the at least one optical fiber for optically coupling the at least one first SPAD diode to the at least one second SPAD diode,
  wherein the quantum-based generator comprises an operating circuit for supplying the at least one first SPAD diode with electrical energy for emitting light, and
  wherein the quantum-based generator comprises a processing circuit for detecting the signal of the at least one second SPAD diode and for forming a random number from the signal of the at least one second SPAD diode as well as for providing the random number to the microcontroller core.

A feature of the microcontroller is the quantum process-based generator (quantum process-based entropy source) for the generation of true random numbers. Said generator is based on an optical quantum process, namely on the combination of stimulated and spontaneous photon emissions in at least one second or receiver SPAD diode, respectively. Said receiver SPAD diode is coupled to at least one first or transmitter SPAD diode via an optical waveguide. Both SPAD diodes are operated in Geiger mode.

A feature of the innovation includes forming the optical fiber as at least part or section of one or more dielectric layers, which is/are part of the metallization stack as insulation layers, which in turn is formed on the semiconductor material in which the first and second SPAD diodes are integrated. Alternatively, the optical fiber can also couple two semiconductor substrates together, in each of which at least one of the first and at least one of the second SPAD diodes are formed. However, it is preferable to design the microcontroller with a semiconductor substrate into which all SPAD diodes are integrated and on the surface of which the optical fiber is arranged.

Due to the emergence of spontaneous and stimulated photon emissions from the second SPAD diode, its emission signal has extremely narrow pulses (hereinafter referred to as spikes) with different heights. The emission signal thus comprises first spikes that arise as a result of single photon emissions. Second spikes in the emission signal of the second SPAD diode, which are higher than the first spikes, occur when a spontaneous photon emission coincides with a stimulated photon emission. The emergence of such combined photon emissions is highly random, i.e. quantum process-based, which is why the evaluation of the temporal sequence of the emergence of second spikes is now suitable for generating a true random number therefrom.

In this respect, in an advantageous further development of the disclosure, it is provided that the emission signal of the at least one second SPAD diode has first spikes and second spikes which are larger than the first spikes, wherein the first and the second spikes are each larger than a predefinable reference value, wherein the first spikes arise due to a spontaneous photon emission of the at least one second SPAD diode without a simultaneously caused stimulated photon emission of the at least one second SPAD diode and the second spikes arise due to the simultaneous occurrence of a spontaneous photon emission of the at least one second SPAD diode stimulated by the reception of a photon of the at least one first SPAD diode, and in that the processing circuit of the quantum process-based generator generates a first logical value or a second logical value as a bit for generating the random number on the basis of a comparison of the time intervals of second spikes with a threshold value or on the basis of a comparison of the time intervals of second spikes with one another.

According to a variant of the disclosure, the true random number is generated such that the processing circuit generates the first logical value or the second logical value on the basis of a comparison of the time interval between two spikes with a threshold value, and in that the processing circuit outputs the first logical value as a bit of the random number if the time interval is smaller than the threshold value, and outputs the second logical value as a bit of the random number if the time interval is greater than the threshold value.

According to a second variant, the true random number is generated such that the processing circuit generates the first logical value or the second logical value based on a comparison of the time intervals of the second spikes of different pairs of second spikes, and in that the processing circuit outputs the first logical value as a bit for generating the random number if the time interval of the most recently occurred second spike is smaller than the time interval between, for example, the penultimate second spike and the antepenultimate second spike or another pair of previous second spikes, and outputs the second logical value as a bit for generating the random number if the time interval of the most recently occurred second spike is, for example, greater than the time interval between, for example, the penultimate second spike and the antepenultimate second spike or another pair of previous second spikes.

For both above-described variants of generating the true random number it applies that if equality is detected when comparing the time intervals with the threshold value (variant 1) or with each other (variant 2), this result is discarded for utilization for the random number. Alternatively, the results of the comparisons for equality could also be utilized, but this would then have to be evaluated purely by chance as either the first logical value or the second logical value.

For the sake of completeness, it should also be mentioned that third spikes can also occur in the emission signal in the second or receiver SPAD diode, which are essentially three times the height of the first spikes. Such events occur when a photon emission, which is stimulated by the reception of a photon of the first SPAD diode, coincides with a spontaneous photon emission from the second SPAD diode, which is in turn stimulated. Advantageously, these "triple spikes" are not used. In this respect, when examining the emission signal of each second SPAD diode, its signal is compared with a predefined reference value range within which it must be located in order to be evaluated for the generation of the true random number.

It is advantageous for parallelizing the generation of the individual bits of the true random number if several pairs of a first SPAD diode and a second SPAD diode are provided, wherein the emissions signals of the second SPAD diodes are feedable to the processing circuit and the processing circuit outputs a different one of the bits for generating the random number based on the emission signal of each second SPAD diode.

A pair of a first SPAD diode and a second SPAD diode is generally sufficient for the sequential generation of the individual bits of the true random number, wherein the processing circuit outputs the logical values of the bits for the generation of the random number sequentially.

A further variant of optical coupling of first and second SPAD diodes can be seen in the fact that single first SPAD diode and several second SPAD diodes are provided which are optically coupled to the single SPAD diode, wherein the emission signals of the second SPAD diodes are feedable to the processing circuit and the processing circuit outputs a different one of the bits for generating the random number based on the emission signal of each second SPAD diode.

To be able to detect function errors and to be able to generate a random number despite an error, an error detection unit and a pseudo-random number generator can be provided in an advantageous manner, wherein the processing circuit of the quantum-based generator switches from outputting bits for generating the random number based on the emission signal of the at least one second SPAD diode to outputting a bit generated by the pseudo-random number generator for generating a pseudo-random number, when the error detection unit detects an error in the function of the components responsible for the optical quantum-based process of the quantum process-based generator or an error of the processing circuit thereof. Here, it can be expedient that the error detection unit outputs an error signal representing for example the type and/or the cause of the error when an error is detected. The error detection unit advantageously recognizes not only that an error exists, but also what type of error has occurred. The reaction of the quantum-based generator to such events depends on the application and can mean, for example, that self-tests are carried out. Preferably, however, in the event that the quantum-based generator is faulty, it is switched to a pseudo-random number generator, which generates a pseudo-random number based, for example, on the last bits generated by the quantum-based generator before the error was detected.

Possible sources of error can be:
malfunction of supply voltages for individual components of the microcontroller,
incorrect signal generation of the first and/or second SPAD diodes,
malfunction in the optical fiber and/or when coupling the first SPAD diodes and/or the second SPAD diodes to the optical fiber,
circuit failures in the analog and/or digital part of the microcontroller and the quantum random number generator, respectively,
incorrect entropy of the supplied random numbers, which can be done by testing, as exemplarily described in David Johnston, Random Number Generators—Principles and Practices, Chapters 8 and 9, 2018, Walter De Gruyter GmbH, Berlin/Boston, ISBN 978-1-5015-1530-2.

The above-described variant of the microcontroller with error detection unit and pseudo-random number generator can also be realized with microcontrollers that have a quantum-based generator other than the one described above. In this respect, independent protection is claimed for the subject matter of this further development.

In an advantageous configuration of the disclosure, it may be provided that the memory elements comprise one or more read/write memories RAM and/or one or more writable non-volatile memories, optionally EEPROM memories and/or flash memories and/or one time programmable (OTP) memories, and/or one or more read-only memories and/or one or more non-volatile manufacturer memories, optionally one or more manufacturer ROMs, and/or one or more manufacturer EEPROMs and/or one or more manufacturer flash memories.

In an expedient configuration of the disclosure, it may be provided that the manufacturer Rom comprises a boot software.

In a further expedient configuration of the disclosure, it may be provided that a manufacturer firewall is provided between the manufacturer memory and the internal bus.

In an expedient further development of the disclosure, the microcontroller may be provided with
a base clock generator,
a clock generator circuit, and/or
a reset circuit, and/or
a power supply or a Vcc circuit with voltage regulators that provide the operating voltages, and/or
a ground circuit, and/or
an input/output circuit, and/or
one or more processing modules,
wherein the processing modules communicate with the internal bus, and
wherein the processing modules comprise one or more of the following modules:
a CRC module (cyclic redundancy check),
a clock generator module,
with a DES accelerator and/or an AES accelerator,
one or more timer modules,
a safety monitoring and control circuit,
a data interface, optionally a Universal Asynchronous Receiver Transmitters.

In a further advantageous configuration of the disclosure, it may be provided that
the semiconductor substrate comprises a surface,
the semiconductor substrate comprises a semiconducting material below its surface,
the surface of the semiconductor substrate comprises a metallization stack,
the metallization stack comprises a typically structured and optically transparent and electrically insulating layer which is located on the surface of the semiconductor substrate,
at least a part of this transparent and electrically insulating layer forms the at least one optical fiber,
the first SPAD diode emits photons from the semiconducting material of the semiconductor substrate into the optical fiber,
the at least one optical fiber transports such photons to the second SPAD diode.

In an expedient configuration of the disclosure it may be provided that the optical fiber irradiates the second SPAD diode in such a way that the light from inside the optical fiber re-enters the semiconducting material of the semiconductor substrate and hits device parts of the second SPAD diode there.

In a further expedient configuration of the disclosure, it may be provided that
the at least one operating circuit at least temporarily supplies the at least one first SPAD diode with electrical energy,
the at least one first SPAD diode feeds photons into the at least one optical fiber when supplied with sufficient electrical energy,
the at least one optical fiber transports such photons to the second SPAD diode, and
the at least one optical fiber emits such photons into the second SPAD diode.

In an advantageous configuration of the disclosure, it may be provided that the one data bus interface is a wired automotive data bus interface or that one or more data bus interfaces of the several data bus interfaces are wired automotive data bus interfaces.

In a further advantageous configuration of the disclosure, it may be provided that the one or more wired automotive data bus interfaces are configured as
a CAN data bus interface, and/or
a CAN FD data bus interface, and/or
a Flexray data bus interface, and/or
an PSI5 data bus interface, and/or
an DSI3 data bus interface, and/or
a LIN data bus interface, and/or
an Ethernet data bus interface, and/or
a MELIBUS data bus interface.

In an expedient further development of the disclosure, it may be provided that the one data bus interface is a wireless data bus interface or that one or more data bus interfaces of the data interfaces are wireless data bus interfaces.

In a further advantageous configuration of the disclosure, it may be provided that the one or more wireless data bus interfaces are configured as
a WLAN interface, and/or
a mobile radio interface, and/or
a Bluetooth interface.

In an expedient configuration of the disclosure, it may be provided that the one data bus interface is a wired data bus interface or that one or more data bus interfaces of the several data interfaces are wired data bus interfaces.

In a further expedient configuration of the disclosure, it may be provided that the one or more wired data bus interfaces are configured as
a KNX data bus interface, and/or
an EIB data bus interface, and/or
a DALI data bus interface, and/or
a PROFIBUS data bus interface.

A significant advantage of the disclosure is that the semiconductor material into which the optically coupled SPAD diodes are integrated is not used for transporting the photons, but rather one or more dielectric layers, i.e. insulation layers of the metallization stack, close to the surface of the semiconductor material are used for the transport. This massively increases the "yield" of photons reaching the receiver SPAD diode, which means that more events can be observed in the receiver SPAD diode in a shorter time, which in turn can be utilized to generate longer quantum process-based random numbers in a very short time and a plurality of quantum process-based random numbers in a very short time, respectively. This increases the effectiveness of the generation of quantum process-based random numbers, which are also secure with regard to so-called post-quantum cryptography (PQK) or quantum computer-resistant cryptography.

BRIEF DESCRIPTION OF THE DRAWINGS

The disclosure is explained in more detail below by means of various examples and with reference to the drawing.

DESCRIPTION

Figure 1:
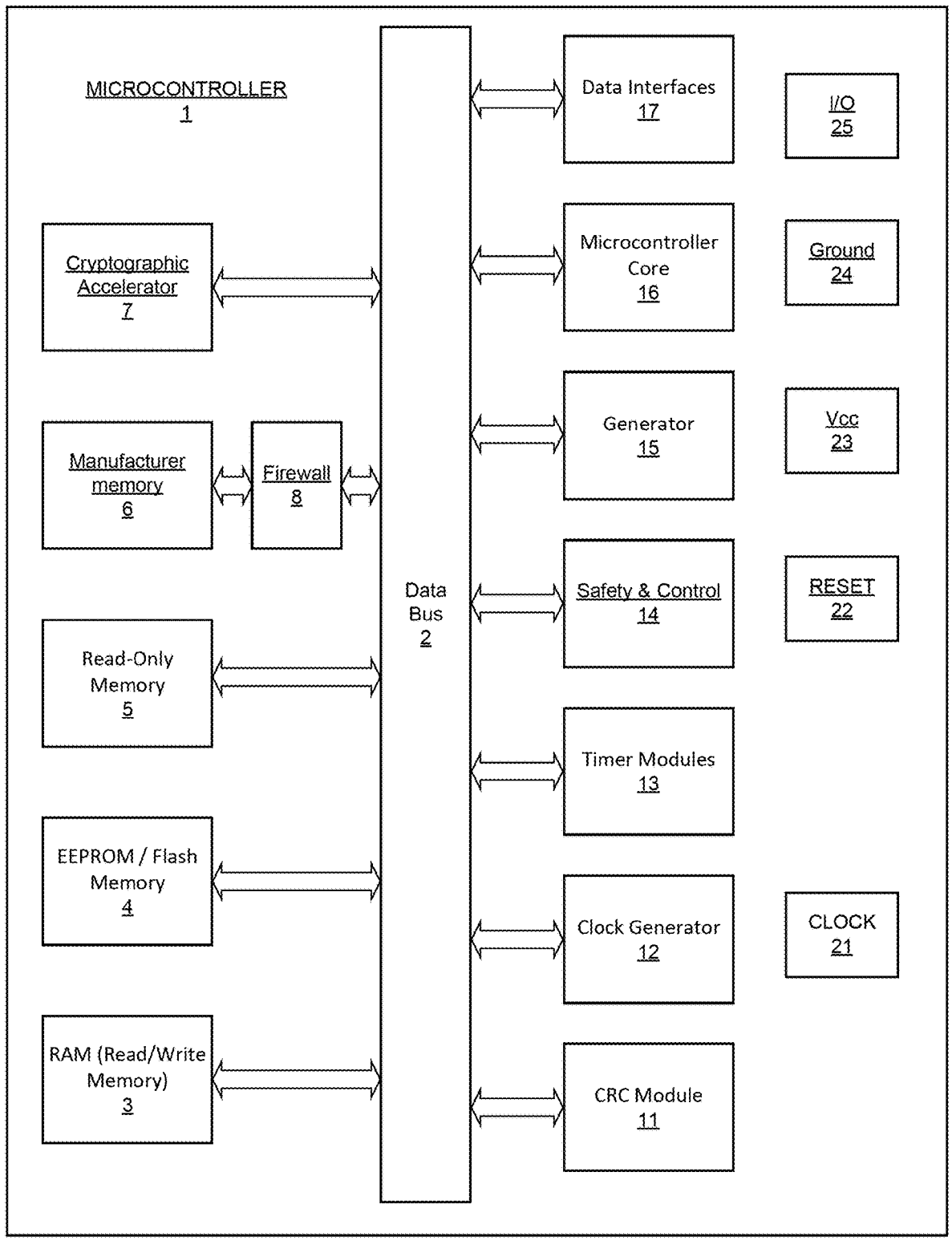
FIG. 1 shows a block diagram of an example of a secure microcontroller 1.

The figures show parts of the proposed devices and methods in an exemplary and simplified manner. For the purpose of illustration, certain examples designed in accordance with the teachings of the disclosure will now be described with reference to the accompanying drawings.

The examples of the disclosure in the following description and in the drawing are to be regarded as illustrative and are not to be regarded as limiting the specific example or element described. Several examples can be derived from the following description and/or the drawings by modifying, combining or varying certain elements. Furthermore, examples or elements that are not described literally can be derived from the description and drawings by a person skilled in the art.

An integrated circuit according to the disclosure preferably comprises a secure microcontroller 1, i.e. a microcontroller with secure encryption of data. FIG. 1 shows an example of a secure microcontroller 1 at block diagram level. For example, the secure microcontroller 1 includes memory elements that are connected to an internal bus 2. For example, the memory elements can comprise one or more read/write memories RAM 3 and/or one or more writable non-volatile memories such as EEPROM memories 4 and/or flash memories 4 and/or OTP memories 4. Furthermore, the secure microcontroller 1 preferably comprises one or more non-volatile, read-only memories 5, such as a ROM. In addition, the secure microcontroller 1 preferably comprises one or more non-volatile, writable and/or non-writable manufacturer memories 6, which typically include reference data that may be of importance for potential subsequent examinations of a microcontroller or other electronic device. In the case on a non-writable manufacturer memory 6, the manufacturer memory 6 can be a manufacturer ROM. Preferably, the manufacturer ROM 6 comprises the boot software. For example, the secure microcontroller 1 comprises one or more cryptographic accelerators 7, for example a DES accelerator and/or an AES accelerator 7, which accelerates cryptographic calculations and is connected to internal bus 2. For example, preferably at least one manufacturer firewall 8 is provided between manufacturer memory 6 and internal bus 2. The microcontroller core 16 accesses said memories via data bus 2. For example, the secure microcontroller 1 comprises processing modules which communicate with microcontroller core 16 via internal bus 2. The processing modules of microcontroller 1 preferably comprise at least one of the following modules: a CRC module (cyclic redundancy check) 11, a clock generator module 12, one or more timer modules 13, a safety monitoring and control circuit 14, one or more quantum process-based generators 15 for true random numbers (Quantum Random Number Generator: QRNG), a 8/16/32/64-bit microcontroller core 16 and one or more data interfaces 17, optionally one or more universal asynchronous receiver transmitter (UART) to support high-speed serial data. The other circuit parts of the secure microcontroller 1 include, for example, one or more base clock generator circuits 21 (CLK) and/or one or more clock generator modules 12, a reset circuit 22, a power supply or Vcc circuit 23 with voltage regulators that provide the operating voltage, a ground circuit 24, and an input/output circuit 25.

Preferably, the secure microcontroller 1 is configured such that it enables secure authentication. Thus, in addition to an authentication code, the secure microcontroller 1 stores further data, e.g. one or more lifetime and usage duration data and/or e.g. logistical data and/or e.g. commercial data and/or website and email addresses and/or image data, a set of instructions for control units of the motor vehicle with which microcontroller core 16 communicates via a data interface. In addition, the secure microcontroller 1 can store further application data.

Preferably, the first integrated circuits comprises, for example, a secure microcontroller 1 configured to facilitate secure authentication of a product.

Figure 2:
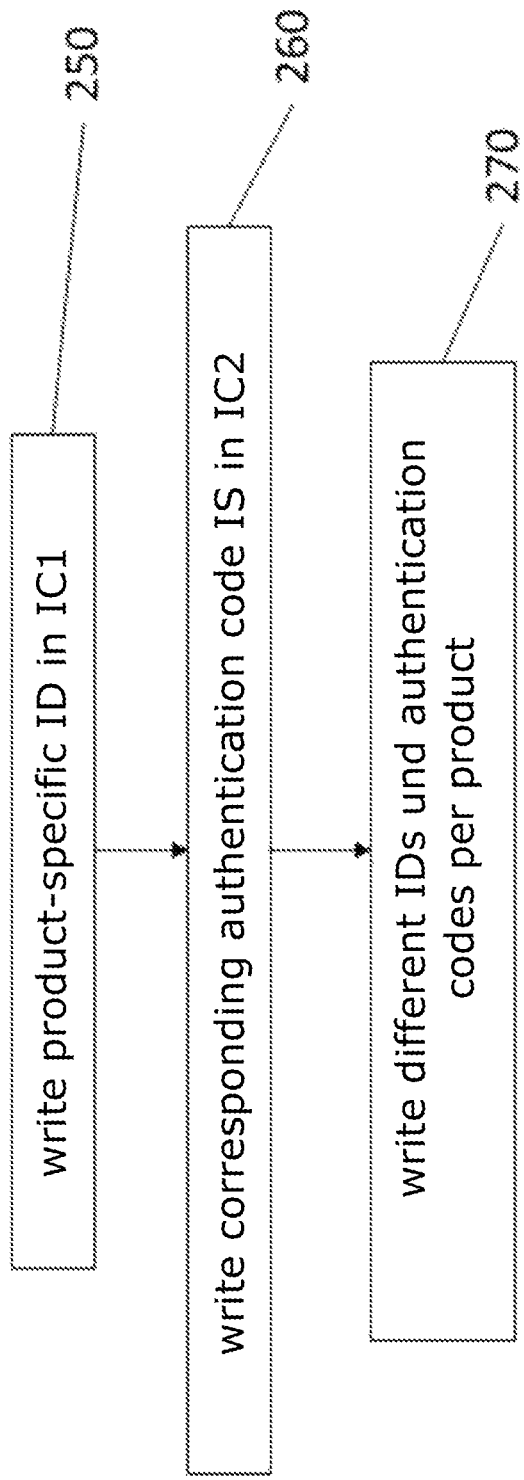
FIG. 2 shows an exemplary process for the protection of a product by means of a first secure microcontroller (IC1) in line with the disclosure and by means of a second secure microcontroller (IC2). Here, the first secure microcontroller (IC1) and the second secure microcontroller (IC2) exchange data with each other, which is preferably encrypted using one or more quantum process-based generators for true random numbers.

FIG. 2 shows an example of a method for manufacturing a circuit for a product comprises the secure microcontroller 1 according to the disclosure. For example, the method includes writing a product ID to a second integrated circuit of the product (block 250). The second integrated circuit preferably comprises a second secure microcontroller 1 in line with this application. For example, the method includes writing an authentication code corresponding to the product ID to the memories of the first integrated circuit of the first secure microcontroller 1 (block 260). The first integrated circuit of the product preferably also comprises a secure microcontroller 1 in line with this disclosure. For example, the method includes writing various product IDs and various corresponding authentication codes to the memories of the respective integrated circuit of the respective secure microcontroller 1. Various product IDs and various corresponding authentication codes can also be written to the memories of the respective integrated circuit of the respective secure microcontroller 1 per product (block 270), so that each product has a unique product ID and a unique authentication code. The latter step, for example, provides a secure and unique authentication code for each product.

For example, some of the features described in this description enable secure authentication of a circuit or product, while at the same time enabling integrated and cost-effective manufacture of that circuit or product. For example, the second integrated circuit is preferably configured such that it enables secure authentication. In various examples, different host devices are able to authenticate the circuit or product, e.g. a car, a smartphone, a web server, any data processing device, etc. In one example, the interface between the host device and the circuit is established via the car's control computer. In another example, a first integrated circuit of the circuit is configured to store additional data such as product-related codes, product setting information, etc. For example, the host device can only access, modify or process such further data once secure authentication has been performed via the first integrated circuit. For example, the first integrated circuit is configured to provide or enable access to the above-mentioned additional data only after authentication. In one example, the product requires little or no adaptation for use in different motor vehicle series.

The internal data bus 2 (see FIG. 1) can comprises several data buses 2 for several microcontroller cores 16, so that these can access different sub-devices of the secure microcontroller 1 independently of one another with a time delay and/or overlapping or simultaneously. However, the secure microcontroller 1 usually comprises only one internal data bus 2 and only one microcontroller core 16. Preferably, microcontroller core 16 is an advanced risk machine (ARM) processor or the like. Preferably, it is an 8-bit or a 16-bit or a 32-bit or a 64-bit microcontroller computer core.

Preferably, the secure microcontroller 1 comprises one or more read/write memories RAM 3. This may be SRAMs and/or MRAMs and/or FRAMS or the like. They can also be dynamic read/write memories such as DRAMs, which have to be read and rewritten at regular intervals in a refresh cycle. To access its memory, the secure microcontroller 1 according to the disclosure can have an access logic that regularly executes the refresh process. However, a DRAM typically opens up opportunities for an attack and is typically a potential vulnerability. The microcontroller core 16 can preferably access this read/write memory RAM 3 by means of internal data bus 2.

Preferably, the secure microcontroller 1 comprises one or more writable and non-volatile memories 4. Microcontroller core 16 can preferably access these writable and non-volatile memories 4 via internal data bus 2. Said non-volatile memories can comprise EEPROM memories 4 or flash memories 4 or OTP memories 4, for example. OTP stands for "one time programmable".

One attack option can be to erase the non-volatile memories 4 by means of radiation, for example X-rays and/or ionizing radiation and/or heating of memory cells. For this purpose, the secure microcontroller 1 preferably comprises one or more safety monitoring and control circuits 14 which monitor the data integrity of the memory cells of the erasable memories 4. Preferably, the memory cells have redundancy in such a way that at least two check bits are provided for a data word, which is preferably a data word of 8 bits in length, i.e. a byte, and that at least one check bit must always have the content 1 and another the content 0. For example, the first check bit can be a parity bit of the byte and the second check bit can be the inverse bit of the parity bit. If an attack with ionizing radiation or the like now occurs, the attack resets both check bits to the same value. The one or more safety monitoring and control circuits 14 detect this deviation and block secure microcontroller 1 from further access.

Preferably, each bit of the memories of the secure microcontroller 1 is designed with redundancy, so that each logical data bit is realized as a pair of a first physical data bit with a first internal logical value and a second physical data bit with a second internal logical value. The second internal logical value is typically the logical inverse of the first internal logical value. The one or more safety monitoring and control circuits 14 preferably monitor that this is always the case. The one or more safety monitoring and control circuits 14 detect deviations and, for example, preferably block the further execution of programs or certain program parts by the microcontroller core 16 and/or block access to data in the event of deviations.

Preferably, the secure microcontroller 1 comprises one or more reset circuits 22 (see FIG. 1). The reset circuits 22 each reset the secure microcontroller 1 and/or sub-devices of the secure microcontroller 1 to predefined states if predetermined or determinable reset conditions and/or combinations and/or time sequences of such reset conditions are present. For example, said condition can be signaling of one or more safety monitoring and control circuits 14. Said conditions can also be changes and/or values of the potential of the operating voltage of the secure microcontroller. Furthermore, such conditions may affect the integrity of the housing of the secure microcontroller 1.

Preferably, the secure microcontroller 1 comprises a detector for opening the housing of the secure microcontroller 1. For example, this can be a single line that surrounds or covers the secure microcontroller 1 as a textile network or fabric, or at least covers parts of the secure microcontroller 1. It can also be a network of lines that cover the secure microcontroller 1 solely for the purpose of detecting an attack. For example, the secure microcontroller 1 can have a first input/output by means of which it can feed an electrical current into such a line and draw it again at a second input/output. If the current flow is interrupted, this is an indication of an attack, which the one or more safety monitoring and control circuits 14 detect and which then signal this attack to microcontroller core 16 of the secure microcontroller 1 according to the disclosure, for example. For example, in such a case of suspected violation of the integrity of the housing, one or more of the one or more safety monitoring and control circuits 14 may disable write and/or read access to memory contents of the memories of the secure microcontroller 1 or erase such contents or set such contents to predefined values or overwrite them with nonsensical data or otherwise manipulate them. The memories of the secure microcontroller 1 preferably comprises one or more non-volatile, read-only memories 5, such as a ROM. The ROM 6 of the secure microcontroller 1 preferably contains data and/or program instructions defined by the design.

Preferably, the secure microcontroller 1 (see e.g. FIG. 1) comprises one or more non-volatile, writable and/or non-writable manufacturer memories 6, in which the semiconductor manufacturer or another supplier can store production and security data, such as serial numbers, etc. Preferably, the semiconductor manufacturer blocks access to this writable and/or non-writable non-volatile manufacturer memory 6 after the last production test has been performed. Preferably, access to the writable and/or non-writable manufacturer memory 6 is possible by means of a manufacturer password. In some cases, a double key procedure makes sense. In such a case, a customer (downstream of the semiconductor manufacturer) stores a customer password in a customer blocking register that can also be blocked for access with a password. Preferably, the semiconductor manufacturer can only access all memory areas of the secure microcontroller 1 with the customer password and the manufacturer password. Preferably, the semiconductor manufacturer provides an analysis password by means of which the manufacturer can cause one or more of the one or more safety monitoring and control circuits 14, typically with the aid of the reset circuit 22, to erase the customer contents and then make all memory areas of the secure microcontroller 1 accessible for the analysis of errors. In the case of a non-writable manufacturer memory, the manufacturer memory 6 can be a manufacturer ROM, for example, the content of which is determined during the manufacture of the semiconductor circuit of the secure microcontroller, for example.

The secure microcontroller is typically adapted to receive and/or send encrypted data and/or program code parts and/or instructions by means of cryptographic methods stored in its memories and executed by microcontroller core 16. Some of these methods require considerable computing power. It has therefore proved useful for microcontroller core 16 not to execute certain program parts of these cryptographic methods in the form of sub-steps of these cryptographic methods, but for one or more special hardware accelerators, preferably in the form of one or more cryptographic accelerators 7, to execute these program parts at an accelerated rate using specially synthesized hardware logic instead of microcontroller core 16. For this purpose, the secure microcontroller 1 preferably has a DES accelerator for the Data Encryption Standard (DES) algorithm and/or an AES accelerator 7 for executing the Advanced Encryption Standard (AES) algorithm, for example. The microcontroller core 16 typically addresses these hardware accelerators 7 via internal data bus 2. Preferably, microcontroller core 16 has a redundant clock system in order to be able to recognize accesses to the clock system. One or more of the one or more security monitoring and control circuits 14 monitor the consistency of the logical contents of this preferred plurality of redundant clock systems, and can thus detect attacks and errors. Preferably, one or more manufacturer memory firewalls 8 prevent microcontroller core 16 and the test logic of the secure microcontroller 1 from accessing the manufacturer memories. They can preferably be unlocked using a manufacturer password as described. Preferably, the number of incorrect entries is very limited in order to minimize the probability of a successful attack.

Preferably, the secure microcontroller comprises one or more CRC modules (cyclic redundancy check) 11 in order to generate the CRC data for serial data communication, which is used in most data protocols to detect faulty data transmissions, on the one hand in the case of a transmission process and on the other hand to be able to check the correct reception of the data message on receipt. Preferably, the safe microcontroller 1 comprises one or more clock generator modules 12 (clock driver, CLK), which generate one or more clocks for operating the circuits of the secure microcontroller. Preferably, the one or more clock generator modules (clock driver, CLK) generate 12 redundant clocks that indicate an attack on the clock system. Typically, the secure microcontroller 1 comprises one or more timer modules 13, such as those required for detecting time-outs. Preferably, the secure microcontroller 1 comprises one or more watchdog timers that monitor the execution of the various program parts. Said watchdog timers can be part of the one or more safety monitoring and control circuits 14.

According to the disclosure (see e.g. FIG. 1), the secure microcontroller 1 comprises at least one quantum process-based generator 15. Quantum-based processes have the advantage that they are based on real chance. In the 1970s, the physicist Bell proved that the theory of "hidden parameters" was wrong. This means that there are no hidden causes for the randomness of quantum mechanical events, such as the emission of photons. For example, microcontroller core 16 can be an 8-bit microcontroller core or a 16-bit microcontroller core or a 32-bit microcontroller core or a 64-bit microcontroller core or a 128-bit microcontroller core or the like. The secure microcontroller 1 can comprise one or more 8/16/32/64/128-bit microcontroller cores 16, which can preferably access the other sub-devices via one or more internal data buses 2. Preferably, the secure microcontroller 1 comprises one or more data interfaces 17. For example, such data interfaces can be one or more universal asynchronous receiver transmitters (UART) to support high-speed serial data. Preferably, the secure microcontroller 1 comprises one or more base clock generators 21 (CLK), each of which preferably provides a base clock 12 to one or more clock generator modules (clock driver, CLK). Preferably, the base clock generators 21 (CLK) are oscillators. Preferably, the secure microcontroller 1 also comprises one or more power supply or Vcc circuits 23 with voltage regulators that provide the operating voltages for the secure microcontroller 1. Preferably, the secure microcontroller 1 also comprises one or more ground circuits 24 (i.e. a circuit inserted in the ground line or a circuit "to ground", in the simplest case a line) comprising, for example, reverse polarity protection and protection circuits against manipulation of the electrical potential of the semiconductor substrate. For example, it is useful if one or more of the ground circuits 24 have reverse polarity protection. For example, it is useful, if one or more of the ground circuits 24 and/or one or more of the power supply or Vcc circuits 23 interact such that the modulation of the power consumption and/or the internal resistance and/or the voltage drop between the supply voltage terminals of the secure microcontroller does not allow any conclusions to be drawn about the operating processes and/or states of the secure microcontroller, at least temporarily.

For controlling other devices and/or for communicating with other devices and/or for monitoring other devices, it is generally useful if the secure microcontroller has one or more input/output circuits 25, which are generally designed as digital inputs and/or as digital outputs, which preferably can also assume a tri-state condition. The secure microcontroller 1 can comprise an analog-to-digital converter allowing the secure microcontroller 1 to monitor internal analog values, such as the operating voltage, and external analog values. Possibly, the secure microcontroller 1 can be provided with a driver stage, for example to drive actuators. Said actuators may be motors and/or other resistive and/or inductive and/or capacitive loads or the like. Such a driver stage can be a half bridge and/or an H-bridge or the like, for example. It is also conceivable that it could be power current sources, for example for lamps such as LEDs.

Thus, the disclosure (see e.g. FIG. 1) proposes a secure microcontroller 1 for controlling devices in automobiles, which comprises a semiconductor substrate. Preferably, the secure microcontroller 1 is manufactured using a CMOS circuit technology or a bipolar circuit technology or a BiCMOS circuit technology. The secure microcontroller preferably comprises memory elements, one or more internal data buses 2, one or more 8/16/32/64-bit microcontroller cores 16, one or more data interfaces, and one or more quantum process-based generators 15. Said one or more quantum process-based generators 15 distinguish the secure microcontroller 1 proposed herein from prior art, which is based on so-called true random number generators, which show a poorer von Neumann entropy of the random numbers generated, which are accordingly "less random".

Internal data bus 2 can comprise several data buses. The memory elements of the secure microcontroller 1 are typically connected to internal data bus 2. The data interfaces are typically also connected to interval data bus 2. The one or more quantum process-based generators 15 are preferably also connected to internal data bus 2. The one or more microcontroller cores 16 are preferably also connected to internal data bus 2. The one or more quantum process-based generators 15 preferably and typically generate one or more random numbers at request of microcontroller core 16. In contrast to the random numbers of the true random number generators from prior art, these are characterized by a particularly advantageous entropy. Preferably, one or more microcontroller cores 16 generate one or more keys using a respective program from one or more of its memory elements and using one or more of the generated random numbers. Typically, the one or more microcontroller cores 16 encrypt and/or decrypt data, which said microcontroller cores 16 typically exchange with devices external to the secure microcontroller via one or more data interfaces, using a respective program of the respective microcontroller core 16, each originating from one or more of its memory elements, using a respective key of the possibly multiple keys. Typically, the semiconductor substrate substantially integrally comprises all sub-devices of the secure microcontroller 1.

In a first further development of the secure microcontroller 1 (see FIG. 1), the memory elements of the secure microcontroller 1 comprise one or more read/write memories RAM 3 and/or one or more writable non-volatile memories 4, for example EEPROM memories 4, and/or flash memories 4 and/or OTP memories 4 and/or one or more read-only memories and/or one or more non-volatile manufacturer memories. For example, the one or more manufacturer memories can comprise one or more manufacturer ROMs 6 and/or one or more manufacturer EEPROMs and/or one or more manufacturer flash memories.

In a second further development, the manufacturer memory, for example a manufacturer ROM 6, comprises the boot software to safely start the secure microcontroller.

In a third further development (see FIG. 1), the secure microcontroller 1 comprises a manufacturer memory firewall 8 between the manufacturer memory 6 and the internal bus 2, which prevents access to the manufacturer memory without authentication.

In a fourth further development (see FIG. 1), the secure microcontroller 1 comprises one or more of the following components: a base block generator 21 (CLK), a clock generator circuit 12, a reset circuit 22, a power supply or a Vcc circuit 23 with voltage regulators providing operating voltages, a ground circuit 24, an input/output circuit 25, and one or more processing modules. The processing modules communicate with internal data bus 2 and thus typically with a microcontroller core 16. The processing modules preferably comprise one or more of the following components: a CRC module (cyclic redundancy check) 11, a clock generator module 12, a crypto accelerator, for example a DES accelerator and/or an AES accelerator 7, one or more timer modules 13, one or more security monitoring and control circuits 14, one or more data interfaces, for example one or more universal asynchronous receiver transmitters (UART) 17 (see FIG. 1).

Figure 3:
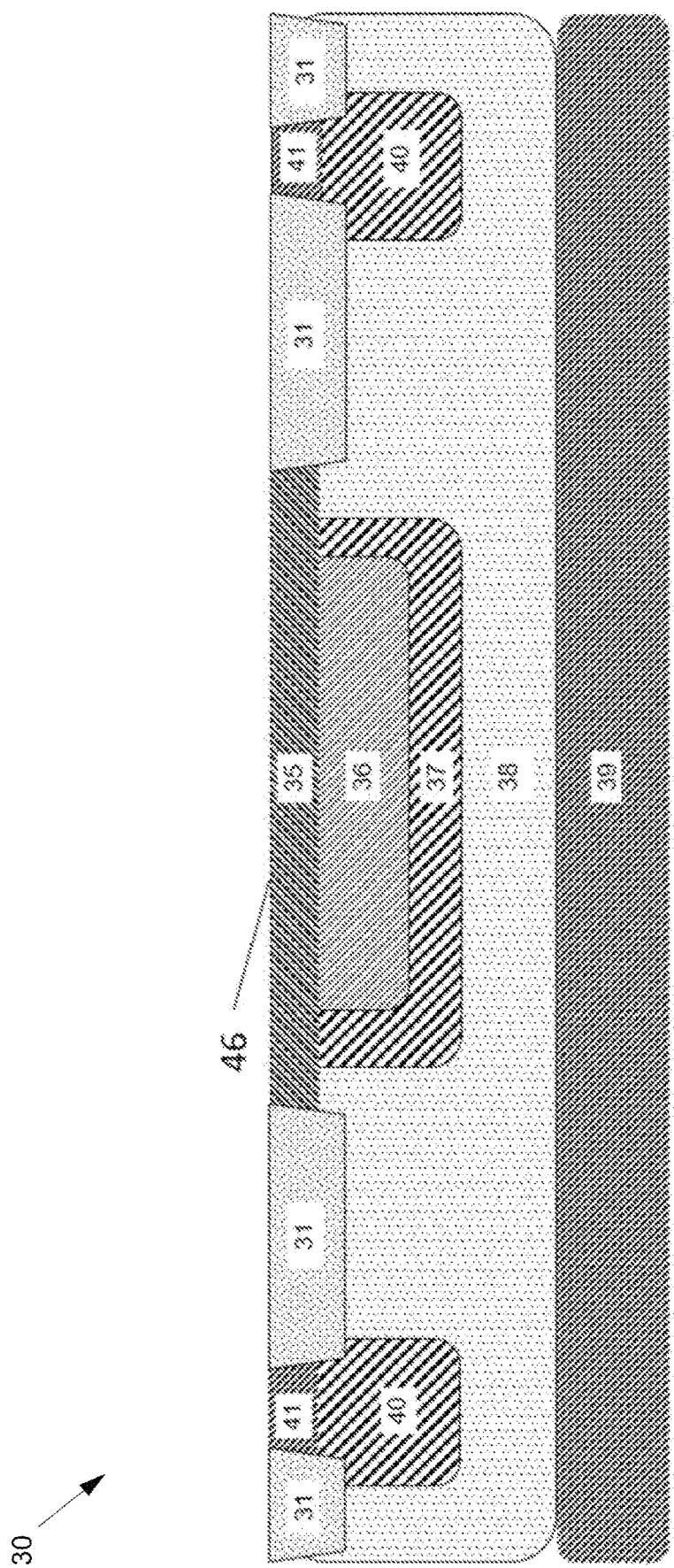
FIG. 3 shows the integration of an SPAD diode in a semiconductor material.

In a fourth further development of the secure microcontroller 1 (see FIGS. 4 and 5), the latter comprises at least one first SPAD diode 44 and at least one second SPDAD diode 45, at least one optical fiber 50, at least one processing circuit, and at least one operating circuit. The circuit integration of a SPAD diode (e.g. the SPAD diode 44 or 45) is shown again in FIG. 3. In said fourth further development according to FIG. 4, the quantum process-based generator 15 (see FIG. 1) comprises at least the first SPAD diode 44 as a source for the optical quantum signal and the second SPAD diode 45 as a photodetector for the optical quantum signal. Furthermore, in said fourth further development, the quantum process-based generator 15 comprises at least the processing circuit and the optical fiber 50. In said fourth further development, the at least one optical fiber 50 optically couples the at least one first SPAD diode 44 with the at least one second SPAD diode 45. The operating voltage supplies the first SPAD diode 44 with electrical energy in such a way that the first SPAD diode 44 emits photons. This is the case if the first SPAD diode 44 has a sufficient electrical bias voltage. In said fourth further development, the processing circuit detects the (output) signal of the second SPAD diode 45 and forms the random number therefrom.

Figure 4:
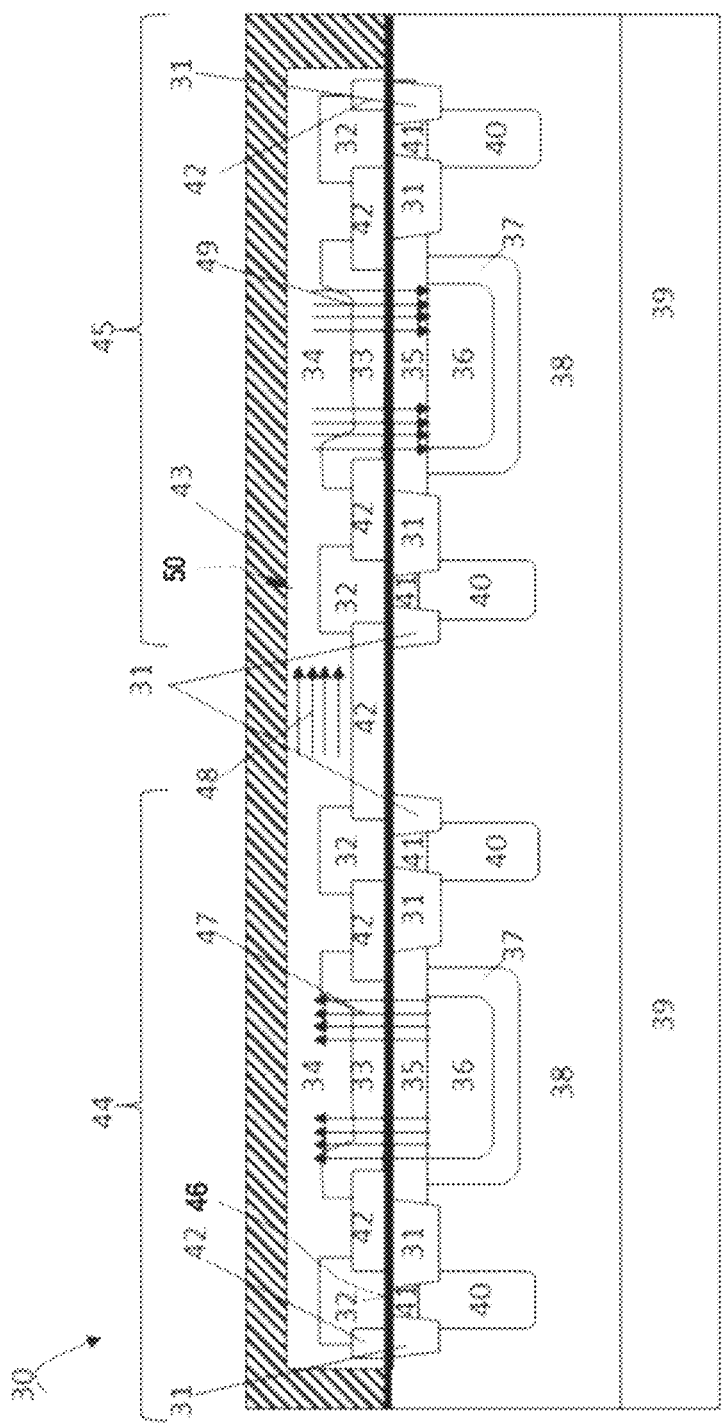
FIGS. 4 and 5 show the combination of a first SPAD diode with a second SPAD diode, both of which are integrated in a semiconductor material and optically coupled by an optical waveguide applied to the semiconductor material as part of the metallization stack, namely as part or section of insulation layers of the metallization stack.
Figure 5:
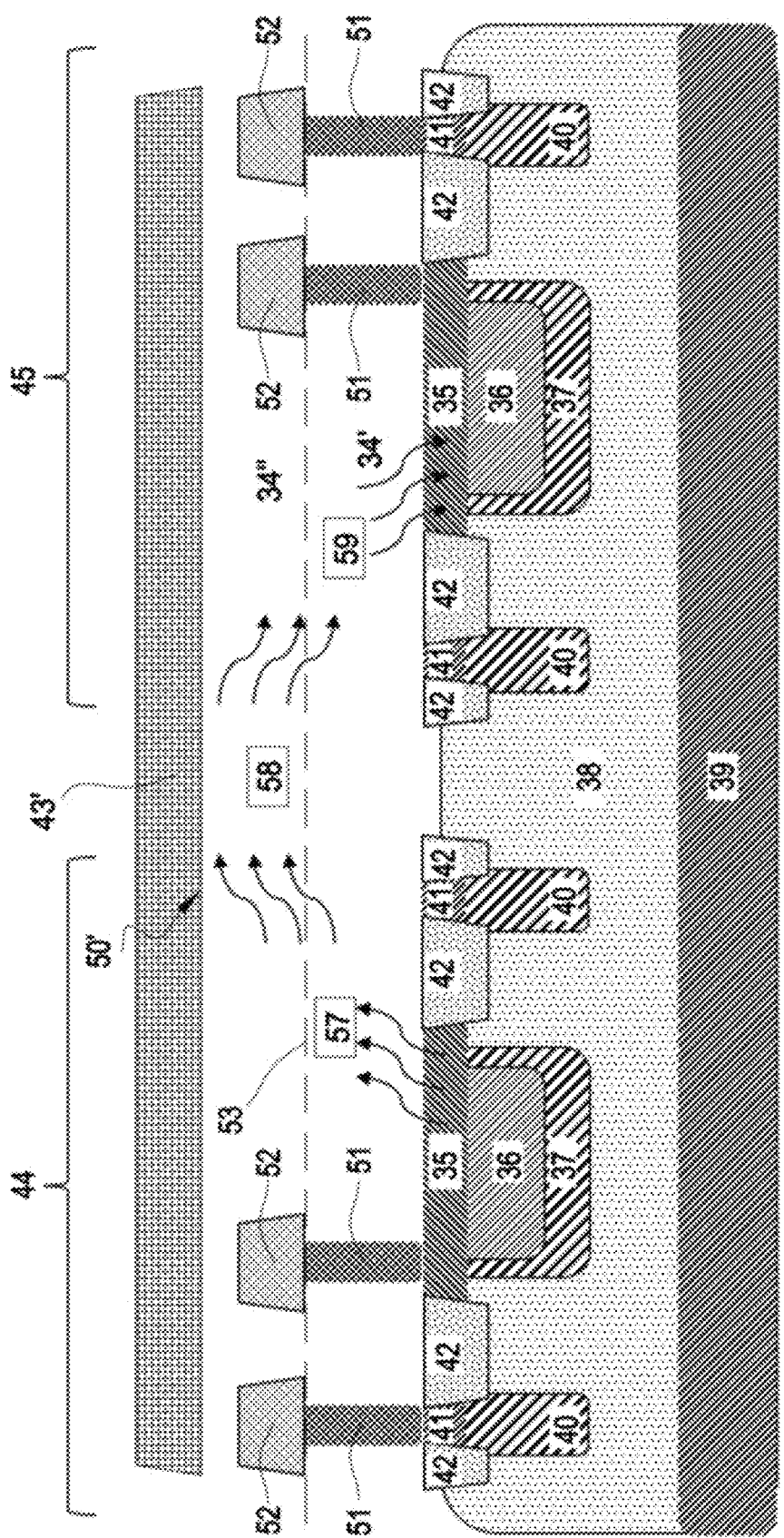

Whereas in the exemplary example of FIG. 4 it is assumed that the optical fiber 50 is formed by the one electrical insulation layer applied to the surface 46 of the semiconductor substrate, FIG. 5 shows an exemplary example in which, for example, two optically transparent and electrically insulating insulation layers 34', 34" form the optical fiber 50'.

The processing circuit then preferably provides the random number thus formed to one or more of the one or more microcontroller cores 16 via internal data bus 2 (FIG. 1). The configuration of said processing circuit will be discussed below in conjunction with FIGS. 6 to 9.

In a sixth further development of the disclosure (see FIGS. 4 and 5), the semiconductor substrate comprises a surface 46. Typically, the semiconductor substrate comprises a semiconducting material below its surface 46. In particular when using conventional manufacturing processes for semiconductor circuits, such as CMOS processes, bipolar processes and BiCMOS processes, there is typically a metallization stack of structured metal layers on surface 46 of the semiconductor substrate, and said metal layers have electrically insulating insulation layers thereon, wherein at least one of said insulation layers 34 forms the optical fiber 50 at least in part or in sections. The structured metal layers typically form conductive paths that are electrically separated from each other by the insulating layers. Thus, the metallization stack comprises s a typically structured and optically transparent and electrically insulating layer 34 of silicon oxide, for example, which is located on the surface 46 of the semiconductor substrate. At least a part of the insulating layer 34 (i.e. a participant of the insulation layer in lateral and/or vertical extension) on the surface 46 of the semiconductor substrate preferably forms the optical fiber 50. The part of the metallization stack located above this insulation layer 34 is shown schematically in FIGS. 4 and 5. The first SPAD diode 44 typically emits light 47 from the semiconducting material of the semiconductor substrate into said optical fiber 50. This means that, in contrast to prior art, the first SPAD diode 44 generally radiates upwards perpendicular to surface 46 and not laterally into the semiconductor substrate, which has a high attenuation. This allows the device to couple more photons of the first SPAD diode 44 directly to the second SPAD diode 45. The optical fiber 50 transports said photons 48 of the first SPAD diode 44 in the optical fiber 50 to the second SPAD diode 45 with virtually no loss compared to prior art. The lowest level of the metallization stack 43 is used to reflect light (photons). The optical fiber 50 irradiates the second SPAD diode 45 with the photons 48 of the first SPAD diode 44 in such a way that the light 49 from inside the optical fiber 50 re-enters the semiconducting material of the semiconductor substrate from the surface 46 and hits device parts of the second SPAD diode 44 there. The second SPAD diode 45 then generates an output signal as a function of the irradiation with the photons 48 (of light 49), from which the quantum process-based random number is generated, which is described further below.

Typically, at least one operating circuit at least temporarily supplies the at least one first SPAD diode 44 with electrical energy. The at least one first SPAD diode 44 then feeds photons 47 into the at least one optical fiber 50 when supplied with sufficient electrical energy. The optical fiber 50 then transports said photons 48 further. The at least one optical fiber 50 then radiates the photons 48 as photons 49 substantially "from above" into the second SPAD diode 45. Since this transport of photons from the first SPAD diode 44 to the second SPAD diode 45 loses significantly fewer photons due to the low attenuation in the optical fiber 50 than in the construction of prior art, which uses the strongly absorbing semiconductor substrate, the quantum efficiency is massively higher. Therefore, in the construction presented herein, a pair of a single first SPAD diode 44 and a single second SPAD diode 45 is sufficient (although, nevertheless, several pairs of SPAD diodes can also be used according to the disclosure). The prior art always uses several SPAD diodes on both the transmitter and receiver side.

FIG. 5 shows that two or more dielectric layers, i.e. optically transparent insulating layers 34', 34", which at least in some areas directly adjoin one another, i.e. are not separated by metallization layers in these areas, form the optical fiber 50'. The contacts 51 and 52 of the SPAD diodes 44 and 45 are positioned in this example in such a way that they are arranged in pairs on both sides of a center region of the optical fiber 50', so that the optical fiber transports photons 57 of SPAD diode 44 in this section of the insulation layers 34', 34" adjacent to each other at a plane 53, as indicated at 58, not necessarily only in the upper of the two insulation layers 34', 34", but also by means of both, until they meet SPAD diode 45 at 59. The contacts 51, 52 advantageously also serve to reflect and thus "introduce" the photons into SPAD diode 45. In this respect, the contacts 51, 52 of SPAD diode 44 also serve to reflect and "redirect" the photons 57 emerging from SPAD diode 44 in the direction of SPAD diode 45.

In another further development of the secure microcontroller 1 according to the disclosure, at least one data interface of the one or more data interfaces is a wired automotive data bus interface. In this case, the wired automotive data bus interface can be, for example, a CAN data bus interface or a CAN FD data bus interface or a Flexray data bus interface or a PSI5 data bus interface or a DSI3 data bus interface or a LIN data bus interface or an Ethernet data bus interface or a or a MELIBUS data bus interface.

In another further development of the secure microcontroller 1 according to the disclosure, at least one data interface is a wireless data bus interface. The wireless data bus interface can be a WLAN interface or a Bluetooth interface, for example.

In another further development of the secure microcontroller 1 according to the disclosure, at least one data interface is a wired data bus interface. The wireless data bus interface can be a KNX data bus interface or an EIB data bus interface or a DALI data bus interface or a PROFUBUS data bus interface, for example.

Figure 6:
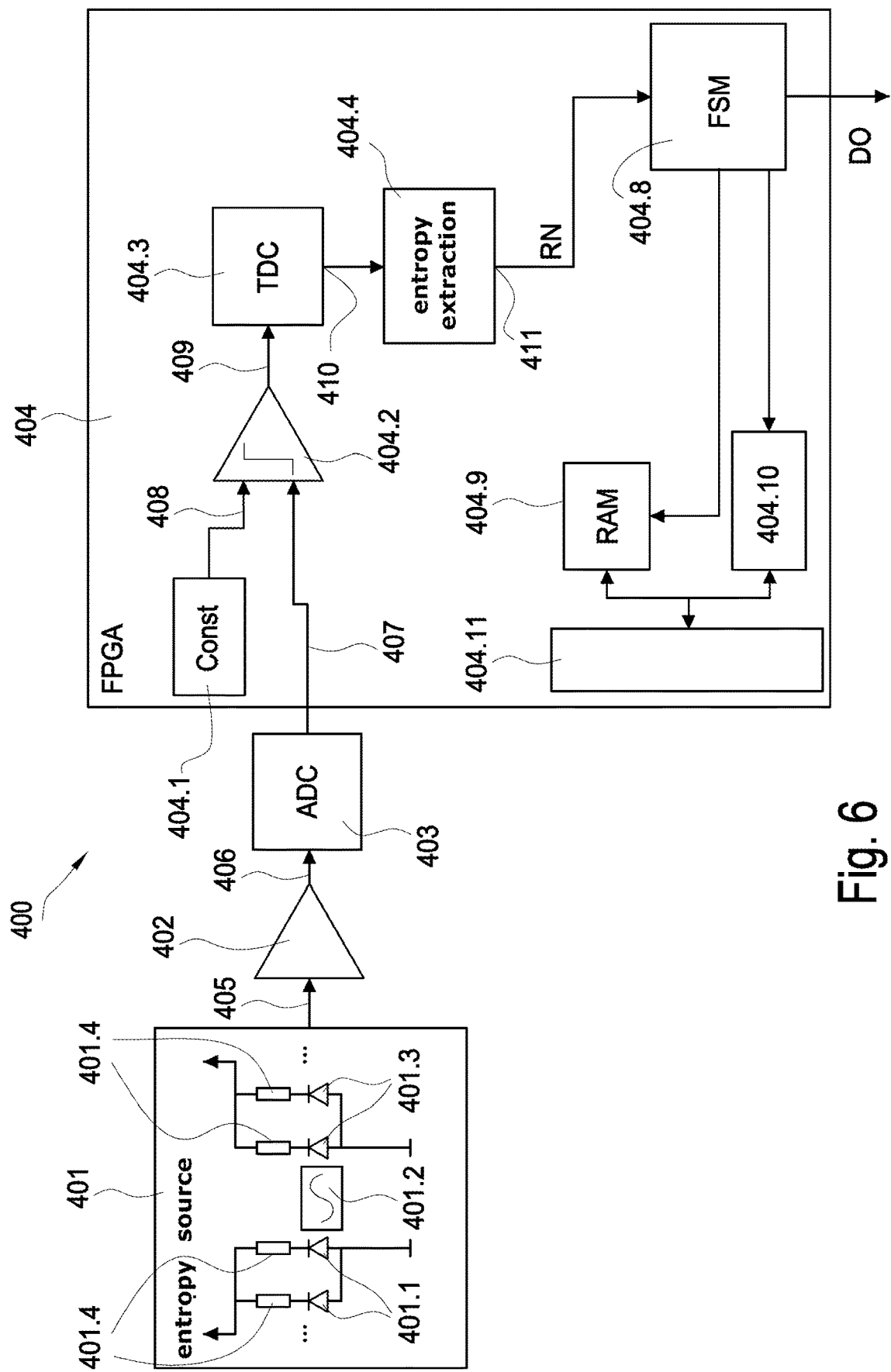
FIG. 6 shows the combination of a quantum-based entropy source of at least one transmitter SPAD diode and at least one receiver SPAD diode with optical fibers that optically couple them and comprise an evaluation and operating circuit.

FIG. 6 schematically shows the simplified block diagram of a quantum-based random number generator QRNG 400 according to an example of the disclosure. The digital circuits of the exemplary device shown in FIG. 6 are preferably clocked with a preferably common clock. The structure includes a quantum process-based entropy source 401, a preferably broadband radio frequency amplifier 402, an analog-to-digital converter 403 having a resolution of e.g. 14 bits and a sampling rate of e.g. 125 MS/s, and a field programmable gate array (FPGA) 404.

The entropy source 401 comprises a 2D array of single photon avalanche diodes (SPAD) 401.1 and 401.3. Said SPAD diodes are operated in Geiger mode with a supply voltage above the breakdown voltage. In addition, a quenching resistor 401.4 is connected in series with each SPAD diode. The quenching resistor 401.4 prevents a thermal destruction of the diode in the event of a triggered charge carrier avalanche. The current signal of the SPAD diodes is measured via a shunt resistor, which can be the quenching resistor or a resistor provided in addition thereto. In the example of FIG. 6, the array of SPAD diodes consists of, for example, four (active or transmitter) SPAD diodes 401.1 and twelve (passive or receiver) SPAD diodes 401.3, which are coupled to the SPAD diodes 401.1 via an optical waveguide 401.2, as described above with reference to FIGS. 4 and 5 for the optical fiber 50. The active SPDAD diodes 401.1 emit light. They correspond to the first SPAD diode 44 of FIGS. 4 and 5. The active SPAD 401.1 are preferably located inside the array of SPAD diodes. The device as proposed supplies the active SPAD diodes 401.1 with an increased supply voltage and therefore operates the active SPAD diodes 401.1 well above the breakdown voltage. This increases the dark count rate, which leads to a higher number of spontaneously emitted photons 47. The optical waveguide 401.2 forwards some of said photons as photons 48 to the passive SPAD diodes 401.3. For example, the optical waveguide 401.2 corresponds to the optical fiber 50 of FIGS. 4 and 5. Each of the passive SPAD diode 401.3 corresponds to the second SPAD diode 45 of FIGS. 4 and 5, for example. The device as proposed supplies the passive SPAD diodes 401.3 with an increased supply voltage and operates the passive SPAD diodes 401.3 slightly above the breakdown voltage. Preferably, the passive SPAD diodes 401.3 are arranged as a ring around the active SPAD diode 401.2. The passive SPAD diodes 401.3 detect the photos arriving via waveguide 401.2. Depending on the arriving photons, the passive SPAD diodes 401.3 generate a current flow through a shunt resistor, for example, and thus a voltage signal.

The voltage signal 405 of the entropy source 401 preferably fed to a broadband, e.g. 40 dB high-frequency amplifier 402. The high-frequency amplifier 402 preferably has a bandwidth of 30 to 4000 MHz and preferably a 1 dB compression point of 20 dBm. The voltage swing of voltage signal 405 of entropy source 401 is typically in the sub-millivolt range. The high-frequency amplifier 402 amplifies the voltage swing of the voltage signal 405 of entropy source 401 to e.g. 50 to 150 mV.

The amplifier output signal 406 of high-frequency amplifier 402 is passed on to an FPGA 404, for example, after an analog-to-digital conversion in ADC 403. Other discrete or ASIC-based solutions are of course possible. In this respect, the FPGA is only one of many different realizations of the technical teaching presented in this example. The FPGA 404 preferably comprises a microcontroller. For example, FPGA 404 can be a Zynq 7010 from Xilinx with a dual-core ARM Cortex-A9 MPCore. This is part of the SPAD evaluation circuit of this exemplary example, which furthermore in the examples of FIGS. 4 and 5 has ADC 403 having, for example, 14 bits with an exemplary sampling rate of 125 mega-samples/s and an exemplary bandwidth of 50 MHz. The amplified voltage signal is available at the input of the high-frequency amplifier 402 as amplifier output signal 406. ADC 403 samples the amplifier output signal 406 of high-frequency amplifier 402. For example, ADC 403 transmits the determined samples of amplifier output signal 406 of high-frequency amplifier 402 digitally with a bit width of e.g. 14 bits to the built-in FPGA 404 of the measurement board.

The device shown as a block diagram in FIG. 6 in a simplified manner includes a comparator 404.2, a time-to-digital converter (TDC) 404.3, an entropy extraction device 404.4, and a finite-state machine 404.8.

For example, comparator 404.2 compares the digital 14-bit value 407 of ADC 403 with a reference value 404.1, which represents a threshold, resulting in a two-clock 1-bit output pulse as output signal 409 of comparator 404.2 if the value at the output of ADC 403 is greater than reference value 404.1. The output signal 409 of the comparator 404.2 is fed to the time-to-digital converter 404.3. The time-to-digital converter 404.3 preferably has a 32-bit counter, for example, that counts up in time with the SPAD evaluation circuit. The bit width of the counter may vary depending on the application. This clock can have a frequency of 125 MHz, for example. The 1-bit output signal of comparator 404.2 preferably resets the counter reading of this counter. The time-to-digital converter 404.3 transmits the counter reading present at this point in time, i.e. the counter reading present immediately before the reset, to its output 410. The count result has a resolution of $1/125$ MHz-8 ns for an exemplary 125 MHz clock. The output 410 of the time-to-digital converter (TDC) 404.3 passes the exemplary 32-bit count result, also referred to as raw data RD, of time-to-digital converter 404.3 to entropy extraction device 404.4. The entropy extraction device 404.4 converts the raw data RD of TDC 404.3 of the signal of output 410 of time-to-digital converter (TDC) 404.3, which is random with respect to its composition and sequence, into a 1-bit random number RN 411 at the output of entropy extraction device 404.4. The output 411 of entropy extraction device 404.4 is connected to the input of a finite-state machine (FSM) 404.8.

FSM 404.8 has the task of receiving data from entropy extraction device 404.4 and generating the QRNG random number therefrom, which FSM 404.8 stores in a memory RAM 404.9 of FPGA 404. After a successful writing operation, FSM 404.8 sets a finish flag 404.10. The finish flag 404.10 is not set at system startup. A microcontroller 404.11, for example a dual-core Arm Cortex-A9 MPCore, accesses the RAM 404.9 block and reads the random number from RAM 404.9. The microcontroller 404.11 is thus e.g. the microcontroller core according to the disclosure.

Figure 7:
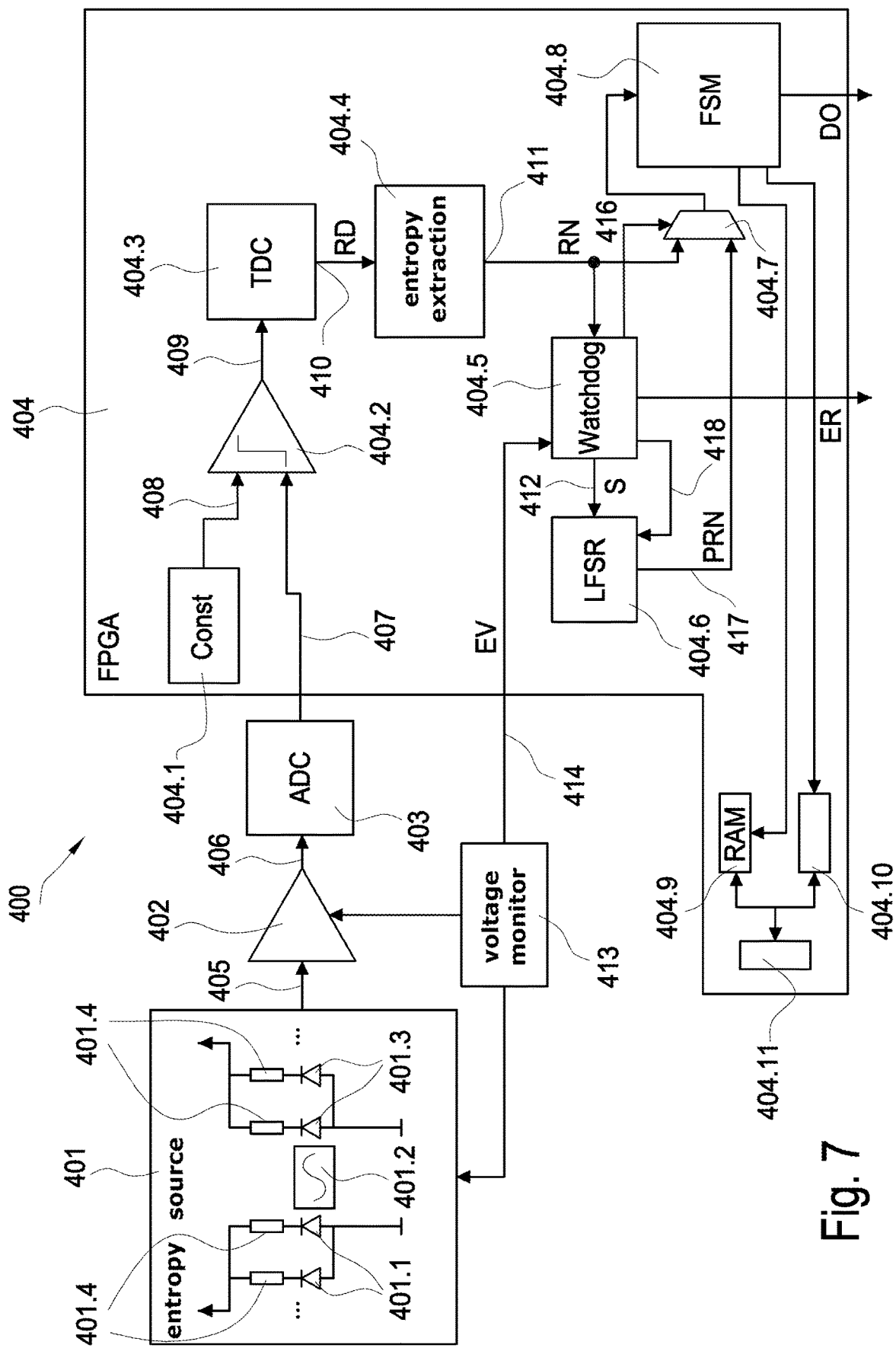
FIG. 7 shows an arrangement similar to that in FIG. 6, but with the addition of a monitoring circuit.

FIG. 7 shows the extended exemplary FPGA design with monitoring of the signal to be used for the random number RN at output 411 of entropy extraction device 404.4 and an additional backup system in case a potential error has occurred during the generation of the QRNG-based random number.

The extension of the device according to FIG. 7 relates to an additional watchdog 404.5, a linear feedback shift register 404.6 as an example of a PRN generator, a signal multiplexer 404.7 and a voltage motor 413. The 404.11 microcontroller can also be set up externally with these components.

The output 411 of entropy extraction device 404.4 is now connected to watchdog 404.5 and signal multiplexer 404.7. The watchdog 404.5 monitors the 1-bit random number RN at output 411 of entropy extraction device 404.4 for validity. The watchdog 404.5 detects at least three defined error cases. For example, watchdog 404.5 sends the last valid random numbers as a seed S output signal 412 to the linear feedback shift register 404.6. If an error occurs, the watchdog sets error bits in an unsigned error register ER of microcontroller 404.11. Which error bit the watchdog 404.5 sets in the error register of microcontroller 404.11 is preferably dependent on the type of error. In addition, watchdog 404.5 is connected to a voltage monitor 413 via one or more, preferably digital, input-output signal lines 414.

For example, voltage monitor 413 monitors the operating voltages of entropy source 401. If the operating voltage of one of the circuits of the SPAD diodes 401.1 and 401.3 is too low, i.e. the amount is below a lower SPAD operating voltage threshold, or too high, i.e. the amount is above an upper SPAD operating voltage threshold, voltage monitor 413 detects this voltage deviation. In the event of such a voltage deviation, voltage monitor 413 signals this to watchdog 404.5 or directly to microcontroller 404.11. In the case of signaling to watchdog 404.5, for example, watchdog 404.5 can generate an interrupt signal for microcontroller 404.11. For example, watchdog 404.5 can trigger such an interrupt of microcontroller 404.11 or another sub-device of an application system if the supply voltage of entropy source 401 or radio frequency amplifier 402 or another device part of the quantum random number generator QRNG 400 is faulty.

If watchdog 404.5 has detected an error, quantum random number generator 400 switches to an emergency state. For this purpose, watchdog 404.5 sets selection signal 416 of signal multiplexer 404.7 so that signal multiplexer 404.7 instead of output 411 of entropy extraction device 404.4 applies a pseudo-random number PRN generated by the linear feedback shift register 404.6 in the form of a stream of pseudo-random bits via a pseudo-random signal line 417 as a substitute for the potentially erroneous 1-bit random number RN present at output 411 of entropy extraction device 404.4 to input of FSM 404.8.

The linear feedback shift register 404.6 is connected to output 412 of watchdog 404.5 and receives its seed S output signal 412 therefrom. In the event of an error, watchdog 404.5 activates the linear feedback shift register 404.6 (see connection 418). The linear feedback shift register 404.6 then generates pseudo-random numbers PRN. The seed S of watchdog output signal 412 preferably comprises the last, for example, 16 random numbers that are still valid (e.g. respectively 1 bit). The watchdog 404.5 preferably applies said last valid random numbers to the input of linear feedback shift register 404.6. The seed S thus serves as a random PQC safe start value for the generator polynomial of the feedback of linear feedback shift register 404.6 for the generation of the pseudo-random number PRN for the pseudo-random signal line 417. The generator polynomial and the degree of the generator polynomial are preferably freely selectable.

The signal of output 411 of entropy extraction device 404.4 with the 1-bit random number RN of entropy extraction device 404.4 and the signal of the pseudo-random signal line 417 with the pseudo-random number PRN of linear feedback shift register 404.6, respectively, are connected to the inputs of signal multiplexer 404.7. The signal multiplexer 404.7 forwards one of its two input signals to FSM 404.8 depending on the value SEL of selection signal 416. It is conceivable to use a multiplexer with more than two inputs and a more complex control signal if the application requires this. The number of inputs of signal multiplexer 404.7 is therefore typically greater than or equal to two.

FSM 404.8 in turn has the task of receiving the random data RN or the pseudo-random number PRN from the output of signal multiplexer 404.7 and writing them to the memory RAM 404.9 of FPGA 404. If the writing process is successful, FSM 404.8 sets the finish flag 404.10 again. The microcontroller 404.11 can then access the memory 404.9 RAM and read the random number and use it for encryption, authentication, signing, etc., for example.

Figure 8:
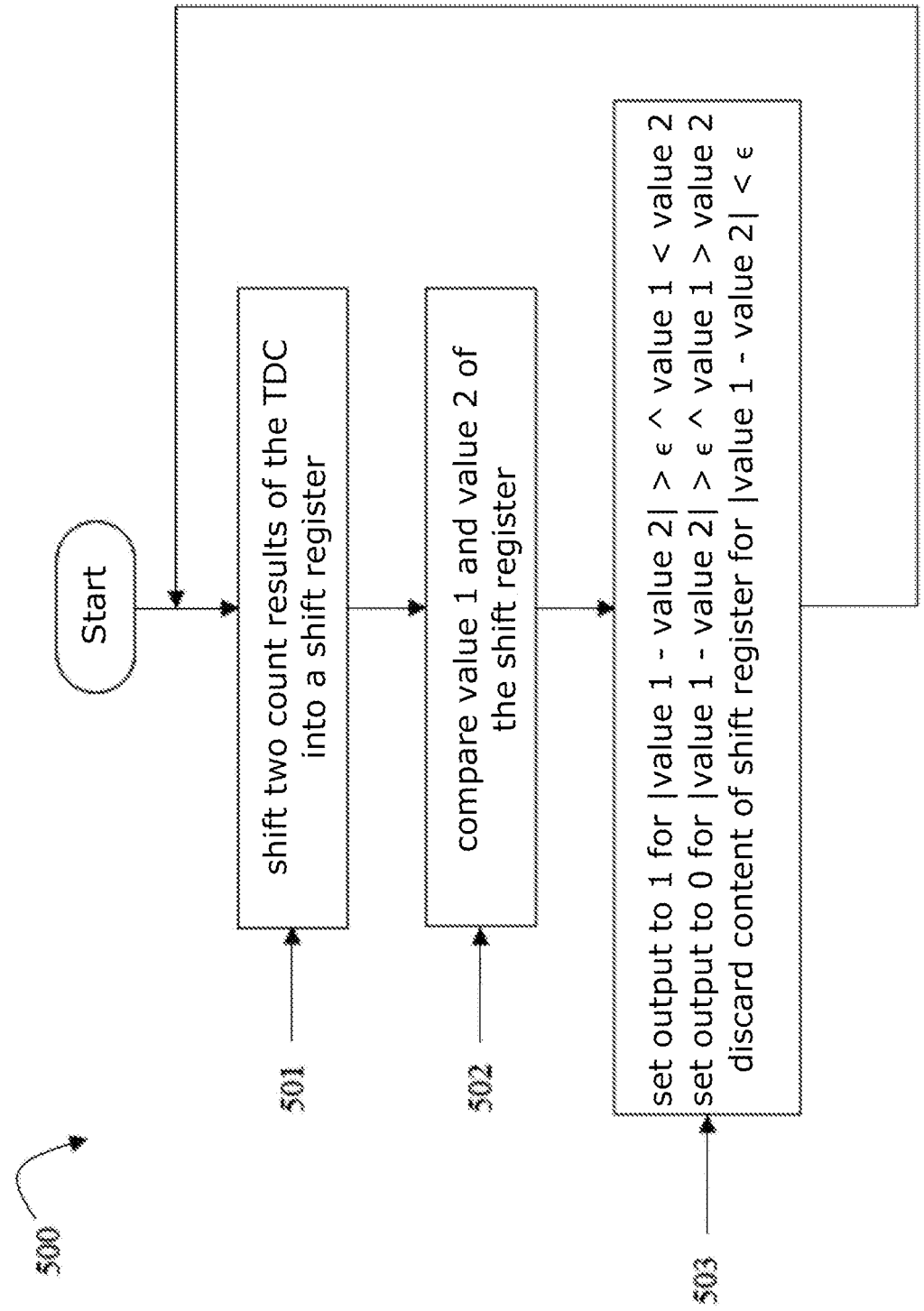
FIG. 8 shows a flow diagram for an entropy extraction method according to an example of the disclosure.

FIG. 8 shows a flow diagram 500 for an entropy extraction method which is carried out, for example, by entropy extraction device 404.4 of QRNG 400 of FIGS. 6 and 7. The method provides for first determining, in a first step 501, two values of output 410 of time-to-digital converter 404.3 and storing them in a shift register of entropy extraction device 404.4. If two values are stored in the shift register of entropy extraction device 404.4, entropy extraction device 404.4 compares these two values in a second step 502. The two values in the shift register of entropy extraction device 404.4 thus comprise a first value and a second value, both of which were determined by time-to-digital converter 404 by means of two different measurements of the respective period between two signal pulses above reference value 404.1. In a third step 503, entropy extraction device 404.4 evaluates the two values. If the first value is smaller than the second value and the difference between value 1 and value 2 is greater than a minimum difference c, entropy extraction device 404.4 sets the value of its output 411 to a first logical value. If the first value is greater than the second value and the difference between the first value and the second value is greater than the minimum difference $\epsilon$, entropy extraction device 404.4 sets its output to a second logical value that is different from the first logical value.

If the difference between the first value and the second value is smaller than the minimum difference $\epsilon$, the entropy extraction discards the first value and the second value. In such a case, the entropy extraction method preferably causes the watchdog (in the device of FIG. 7) to increment an error counter by a first error counter increment. The first error counter increment can be negative. Conversely, entropy extraction device 404.4 can decrease the error counter of the watchdog by a second error counter increment if the difference between the first value and the second value is greater than the minimum difference $\epsilon$. The second error counter increment can be the same as the first error counter increment. Typically, the signs of the first error counter increment and the second error counter increment are the same. Preferably, microcontroller 404.11 can set the error counter increments and the start value of the error counter and an error counter threshold value. If the count reading of the error counter crosses the error counter threshold, watchdog 404.5 signals the presence of a critical error state, preferably by means of an interrupt or another signaling to the microcontroller. The microcontroller 404.11 then typically starts a self-test program to test the various parts of the quantum random number generator 400 according to FIG. 7. Preferably, the microcontroller can, for example, set the analog-to-digital converter 403 to a state in which microcontroller 404.11 can write test values to an output register of the analog-to-digital converter, which the subsequent signal chain then processes like real sampled values. Since the test values are known in advance, the correct reaction of the rest of the system, for example the incrementing of the error counter in watchdog 404.5 by microcontroller 404.11, can be monitored and evaluated. Preferably, microcontroller 404.11 can therefore monitor all memory nodes of FPGA 404 and read their logical state.

If a value is less than a minimum value, it is a value that is within the dead time of the SPAD diodes. Such a value is preferably discarded, and the error counter is incremented by the first error increment. In this case, entropy extraction device 404.4 waits for the time-to-digital converter 404.3 to determine the next value.

Once the random bit has been extracted in this way, the method starts again from the beginning.

If the error counter crosses or reaches the error counter threshold, there may be an error in which the time-to-digital converter supplies constant numbers, for example.

This device is therefore able to detect a failure of the power supply of the entropy source or other parts of the device. The microcontroller 404.11 can also record ADC 403 for test purposes and voltages and currents in the quantum random number generator 400 and compare the values determined in this way with expected value ranges within which these values must lie. The microcontroller 404.11 can also record digital values within quantum random number generator 400. For example, microcontroller 404.11 can set reference value 404.1 so low for test purposes that time-to-digital converter 404.3 is substantially controlled by the signal noise at its input. The values of time-to-digital converter 404.3 should then satisfy the expected statistics within a tolerance band. If this is not the case, there is an error.

The watchdog 404.5 can monitor the entropy of the random numbers provided. If the average entropy of the bits over an entropy measurement period deviates by more than a permitted entropy deviation value of e.g. 50%, the watchdog concludes that an error has occurred and increments the error counter. Preferably, the watchdog then stops the use of these random bits at output 411 of entropy extraction device 404.4 to prevent the sending of plaintext. "Plain text" refers to information that can be understood by a third party using statistical methods or directly, as the information is only poorly encrypted. It is conceivable that a logical "permanent one" or a logical "permanent zero" is generated by chance even with functioning sub-devices. It therefore makes sense if the maximum length of a bit sequence at the output of the entropy extraction device is limited to a value that can be programmed by microcontroller 404.11.

Substantially, the quantum random number generator 400 described above can thus recognize the following errors and catch them with a lower safety level by means of an emergency mode using a linear feedback shift register 404.6 or another PRN generator:

malfunction of supply voltages,
incorrect signal generation of the SPAD diodes 401.1 and 401.3,
malfunction of optic fiber 401.2 and/or the couplings of the SPAD diodes 401.1 and 401.3 to optical fiber 401.2,
circuit failures in the FPGA 404, i.e. in the digital part of the quantum random number generator 400,
incorrect entropy of the supplied random numbers, which can be done by testing the 1-bit random number RN, as described in e.g. David Johnston, Random Number Generators-Principles and Practices, Chapters 8 and 9, 2018, Walter De Gruyter GmbH, Berlin/Boston, ISBN 978-1-5015-1530-2.

It is conceivable to use a second complete quantum random number generator 400 instead of the linear feedback shift register 404.6, whose signal at the output of its entropy extraction device 404.4 is then used for emergency mode instead of the signal of the pseudo-random signal line 417.

Figure 9:
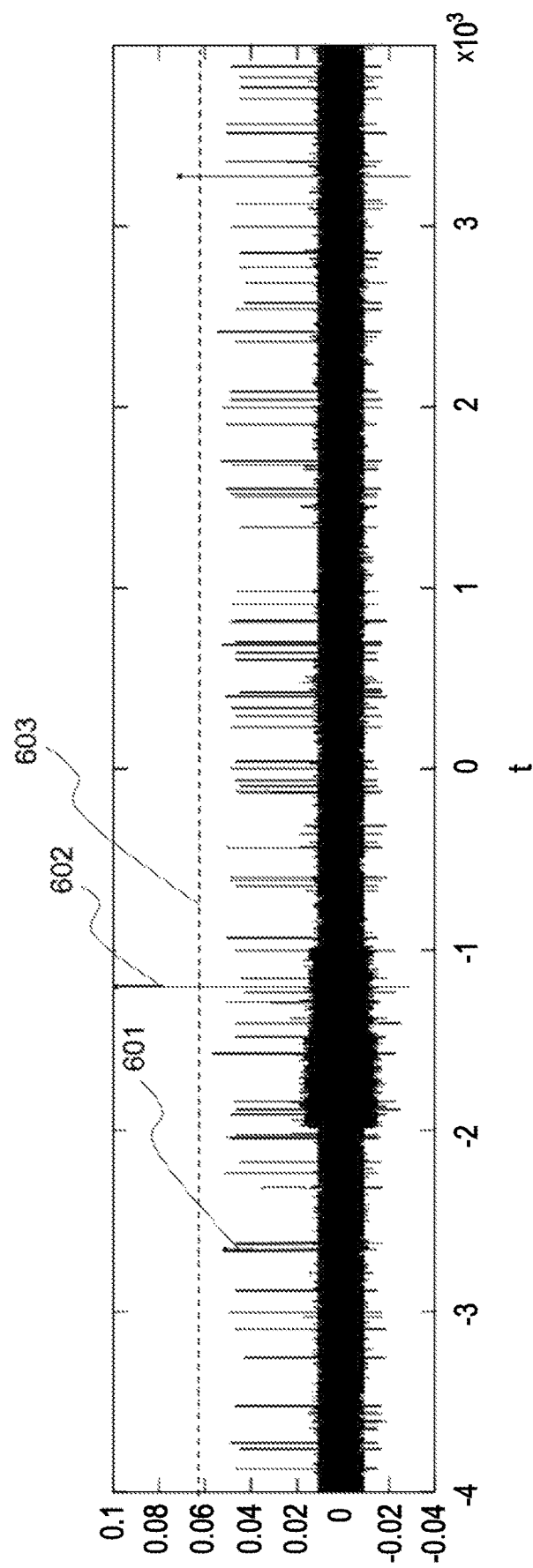
FIG. 9 shows a typical output signal of a receiver SPAD diode.

FIG. 9 shows an exemplary oscillogram of voltage signal 405 at the output of entropy source 401. As can be seen, first spikes occur with a first height class 601 and second spikes with a second height class 602. The scatter of the first height class 601 of the first spikes and the scatter of the second height class of the second spikes is so small in each case that a clear separation of both height classes 601, 602 is possible by means of a cutting level 603. The cutting level 603 corresponds to the value that microcontroller 404.11 sets as reference value 404.1. For the formation of the first and second spikes as a result of the simultaneous occurrence of a spontaneous and a stimulated photon emission of the second SPAD diode or one of the second SPAD diodes (second spikes) and as a result of exclusively to a spontaneous photon emission of the second SPAD diode or one of the second SPAD diodes (first spikes), please refer to the explanation above in the test.

Figure 10:
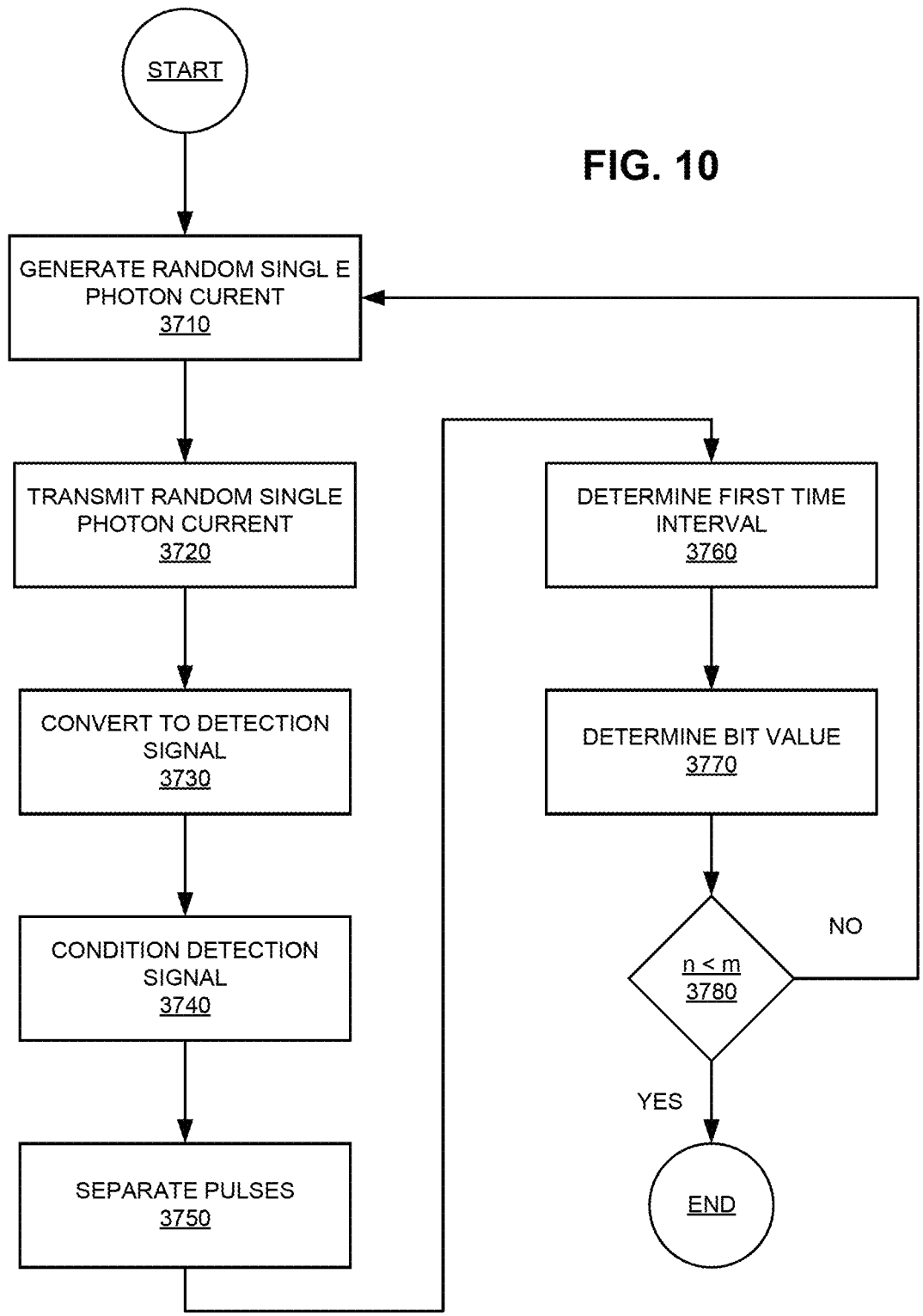
FIG. 10 schematically shows the individual method steps for generating a quantum random number using the optical quantum-based process according to the disclosure.

FIG. 10 schematically shows the method 3700 as proposed for generating a quantum random number. The method 3700 starts with generating 3710 a random single photon current (47, 48, 49, 401.2) by means of one or more first SPAD diodes (401.1, 44). The method 3700 continues with transmitting 3720 the random single photon current (47, 48, 49, 401.2) by means of an optical fiber (44, 401.2) different from the semiconductor substrate (49, 48) to one or more second SPAD diodes (401.3, 45). This is followed by converting 3730 the random single photon current (47, 48, 49, 401.2) into a detection signal in the form of a voltage signal 405 of the entropy source 401, which preferably comprises the first SPAD diodes 401.1 and the optical fiber 401.2 and the second SPAD diodes 401.3. This is then followed by conditioning 3740, optionally amplifying and/or filtering and/or analog-to-digital converting, the detection signal into a conditioned detection signal, optionally a digital 14-bit value 407 of the analog-to-digital converter 403. Then separating 3750 the pulses of the conditioned detection signal produced by coupling the emissions of a first SPAD diode 401.1 and a second SPAD diode 401.3 from the pulses of the conditioned detection signal produced exclusively by spontaneous emission by comparing the conditioned detection signal with a threshold value, optionally in a comparator (see 404.2 in FIGS. 6 and 7), and generating a corresponding output signal 409, optionally of the comparator 404.2 This is followed by determining 3760 a first time interval between the first pulse and the second pulse of a first pair of two successive photons produced by couplings of the spontaneous photon emission of a first SPAD diode 401.1 with a photon emission of the second SPAD diode 401.3 stimulated by the photon emission, and determining a second time interval between a third pulse and a fourth pulse of a second pair of two successive pulses of the conditioned detection signal produced by the same kind of couplings of the emissions of a first SPAD diode 401.1 and a second SPAD diode 401.3 and, optionally, for determining the first value of the output 410 of the time-to-digital converter 404.3 and the second value of the output 410 of the time-to-digital converter 404.3. The bit value of a random bit is then determined 3770 on this basis by comparing the value of the first time interval and the value of the second time interval. The last step 3780 checks whether the number n of random bits determined is still smaller than the number m of random bits of the desired quantum random number. If this is not the case, the above steps are repeated. Otherwise, the process of generating a quantum random number is complete.

The secure microcontroller presented herein has an improved entropy of its at least one random number generator. As a result, the encryption that can be achieved with the microcontroller is more effective compared to prior art and is also post quantum secure. However, the advantages of the disclosure are not limited thereto.

The above description does not claim to be exhaustive and is not limited to the examples shown. Other variations on the examples described herein may be understood and practiced by those of ordinary skill in the art with reference to the drawings, description and claims. The indefinite singular article "a" does not exclude the plural, while mentioning a certain number of elements does not exclude the possibility that there are more or fewer elements. A single unit can fulfill the functions of several elements mentioned in the description, and vice versa, several elements can fulfill the function of one unit. Numerous alternatives, equivalents, variations and combinations are possible without departing from the scope of the present application.

Unless otherwise indicated, all features of the present disclosure can be freely combined with one another. This applies to the entire application presented herein. Unless otherwise indicated, the features described in the figure description can also be freely combined with the other features as features of the disclosure. A restriction of individual features of the examples to the combination with other features of the examples is expressly not intended. In addition, device features of the device can also be reformulated as method features and method features can be reformulated as device features of the device. Such a reformulation is thus also automatically disclosed.

In the preceding detailed description, reference is made to the attached drawings. The examples in the description and the drawings are to be regarded as illustrative and are not to be regarded as limiting the specific example or element described. Several examples can be derived from the proceeding description and/or the drawings and/or the claims by modifying, combining or varying certain elements. Furthermore, examples or elements that are not described literally can be derived from the description and/or the drawings by a person skilled in the art.

The disclosure was described above with reference to a microcontroller for automotive applications. However, it is clear to the person skilled in the art that the intended use in this respect based on the disclosure both in the patent application(s) giving rise to a right of priority and in the present PCT application is not restrictive. Rather, the microcontroller according to the disclosure can be used in all devices involving PQK-secure encryption and/or the PQR signature of data and the editing and processing of security-relevant data. A PQR encryption can preferably be carried out using one of the following methods:

BIKE1-L1-CPA, BIKE1-L3-CPA, BIKE1-L1-FO, BIKE1-L3-FO, Kyber512, Kyber768, Kyber1024, Kyber512-90s, Kyber768-90s, Kyber1024-90s, LEDAcryptKEM-LT12, LEDAcrypt-KEM-LT32, LEDAcryptKEM-LT52, NewHope-512-CCA, NewHope-1024-CCA, NTRU-HPS-2048-509, NTRU-HPS-2048-677, NTRU-HPS-4096-821, NTRU-HRSS-701, LightSaber-KEM, Saber-KEM, FireSaber-KEM, BabyBear, BabyBearEphem, Mama-Bear, MamaBearEphem, PapaBear, PapaBearEphem, FrodoKEM-640-AES, FrodoKEM-640-SHAKE, FrodoKEM-976-AES, FrodoKEM-976-SHAKE, FrodoKEM-1344-AES, FrodoKEM-1344-SHAKE, SIDH-p434, SIDH-p503, SIDH-p610, SIDH-p751, SIDH-p434-compressed, SIDH-p503-compressed, SIDH-p610-compressed, SIDH-p751-compressed, SIKE-p434', SIKE-p503, SIKE-p610', 'SIKE-p751, SIKE-p434-compressed, SIKE-p503-compressed, SIKE-p610-compressed, SIKE-p751-compressed.

A PQR signature can preferably be created using one of the following methods:

DILITHIUM_2, DILITHIUM_3, DILITHIUM_4, MQDSS-31-48, MQDSS-31-64, SPHINCS+-Haraka-128f-robust, SPHINCS+-Haraka-128f-simple, SPHINCS+-Haraka-128s-robust, SPHINCS+-Haraka-128s-simple, SPHINCS+-Haraka-192f-robust, SPHINCS+-Haraka-192f-simple, SPHINCS+-Haraka-192s-robust, SPHINCS+-Haraka-192s-simple, SPHINCS+-Haraka-256f-robust, SPHINCS+-Haraka-256f-simple, SPHINCS+-Haraka-256s-robust, 'SPHINCS+-Haraka-256s-simple, SPHINCS+-SHA256-128f-robust, SPHINCS+-SHA256-128f-simple, SPHINCS+-SHA256-128s-robust, SPHINCS+-SHA256-128s-simple, SPHINCS+-SHA256-192f-robust, SPHINCS+-SHA256-192f-simple, SPHINCS+-SHA256-192s-robust, SPHINCS+-SHA256-192s-simple, SPHINCS+-SHA256-256f-robust, SPHINCS+-SHA256-256f-simple, SPHINCS+-SHA256-256s-robust, SPHINCS+-SHA256-256s-simple, SPHINCS+-SHAKE256-128f-robust, SPHINCS+-SHAKE256-128f-simple, SPHINCS+-SHAKE256-128s-robust, SPHINCS+-SHAKE256-128s-simple, SPHINCS+-SHAKE256-192f-robust, SPHINCS+-SHAKE256-192f-simple, SPHINCS+-SHAKE256-192s-robust, SPHINCS+-SHAKE256-192s-simple, SPHINCS+-SHAKE256-256f-robust, SPHINCS+-SHAKE256-256f-simple, SPHINCS+-SHAKE256-256s-robust, SPHINCS+-SHAKE256-256s-simple, picnic_L1_FS, picnic_L1_UR, picnic_L3_FS, picnic_L3_UR, picnic_L5_FS, picnic_L5_UR, 'picnic2_L1_FS', picnic2_L3_FS, picnic2_L5_FS, qTesla-p-I, qTesla-p-III'.

For example, the concept according to the disclosure can be used to generate the addresses in a communication bus system with automatic addressing of the subscribers by the bus master in the bus master or in the subscribers to be addressed. Thus, the disclosure can be used not only for encryption techniques for generating PQK-secure codes. PQK stands for "post-quantum cryptography" and refers to a subfield of cryptography, namely the subfield of quantum computer-resistant cryptography, which deals with cryptographic primitives that, unlike most currently used asymmetric cryptosystems, are practically impossible to decrypt even using quantum computers (see the definition in Wikipedia). Different codes can also be used to better distinguish the signals emitted by a system of basically any design in order to separate these signals and to separate these signals from neighboring systems that may interfere with each other in terms of signal technology. If you think of an ultrasonic measuring device in the automotive sector, for example, it can be advantageous to make the individual received signals distinguishable with regard to their origin, i.e. with regard to the emitting transmitter from which the signals originate.

The following listing of the disclosure summarizes the features of the disclosure and its further developments once again. Applications of the technical teaching can combine the features with each other, provided that these combinations do not cause factual contradictions. In this respect, the dependencies and references presented herein only represent particularly preferred, exemplary examples.

Item 1) A secure microcontroller 1 for controlling devices in an automobile
comprising a semiconductor substrate, and
comprising memory elements, and
comprising at least one internal bus 2, and
comprising at least one 8/16/32/64-bit microcontroller core 16, and
comprising one ore more data interfaces, and
comprising at least one quantum process-based generator 15, and
wherein the memory elements are connected to internal bus 2, and
wherein the data interface is connected to internal bus 2, and
wherein the quantum process-based generator 15 is connected to internal bus 2, and
wherein microcontroller core 16 is connected to internal bus 2, and
wherein the quantum process-based generator 15 generates a random number at the request of microcontroller core 16, and
wherein microcontroller core 16 generates a key using of a program from one or more of its memory elements and using the random number, and
wherein microcontroller core 16 uses a program from one or more of its memory elements and the key to encrypt and decrypt data which it exchanges with devices external to the secure microcontroller, and
wherein the semiconductor substrate integrally comprises said sub-devices of the secure microcontroller 1,
wherein said sub-devices of the secure microcontroller 1 include the memory elements, internal bus 2, the at least one 8/16/32/64-bit microcontroller core 16, the data interfaces and the quantum process-based generator 15.

Item 2) The secure microcontroller 1 according to item 1), wherein the memory elements comprise one or more read/write memories RAM 3 and/or one or more writable non-volatile memories, optionally EEPROM memories 4 and/or flash memories 4 and/or OTP memories 4, and/or one or more read-only memories and/or one or more non-volatile manufacturer memories, optionally one or more manufacturer ROMs 6, and/or one or more manufacturer EEPROMs and/or one or more manufacturer flash memories.

Item 3) The secure microcontroller 1 according to item 2), wherein the manufacturer ROM 6 comprises the boot software.

Item 4) The secure microcontroller 1 according to item 2) or 3),
wherein manufacturer firewall 8 is provided between manufacturer memory 6 and internal bus 2.

Item 5) The secure microcontroller 1 according to one or more of items 1) to 4),
comprising one or more of the following components:
a base clock generator 21 (CLK),
a clock generator circuit 12, and/or
a reset circuit 22, and/or
a power supply or a Vcc circuit 23 with voltage regulators that provide the operating voltages, and/or
a ground circuit 24, and/or
an input/output circuit 25, and/or
one or more processing modules,
wherein the processing modules communicate with internal bus 2, and
wherein the processing modules comprise one or more of the following modules:
a CRC module (cyclic redundancy check) 11,
a clock generator module 12,
comprising a DES accelerator and/or an AES accelerator 7,
one or more timer modules 13,
a safety monitoring and control circuit 14,
a data interface, optionally a universal asynchronous receiver transmitter (UART) 17.

Item 6) The secure microcontroller 1 according to one or more of items 1) to 5),
comprising at least one first SPAD diode 44, and
comprising at least one second SPAD diode 45, and
comprising at least one optical fiber 50, and
comprising at least one processing circuit, and
comprising at least one operating circuit,
wherein the quantum process-based generator 15 comprises at least the first SPAD diode 44 as a light source for an optical quantum signal, and
wherein the quantum process-based generator 15 comprises at least the second SPAD diode 45 as a photodetector for the optical quantum signal, and
wherein the quantum process-based generator 15 comprises at least the processing circuit, and
wherein the quantum process-based generator 15 comprises at least the optical fiber, and
wherein the at least one optical fiber 50 optically couples the at least one first SPAD diode 44 with the at least one second SPAD diode 45, and
wherein the operating circuit supplies the first SPAD diode 44 with electrical energy such that the first SPAD diode emits light 44, and
wherein the processing circuit detects the signal of the second SPAD diode 45 and forms the random number therefrom and provides the latter to microcontroller core 16.

Item 7) The secure microcontroller 1 according to item 6),
wherein the semiconductor substrate comprises a surface 46, and
wherein the semiconductor substrate comprises a semiconducting material below its surface 46, and
wherein the surface 46 of the semiconductor substrate comprises a metallization stack, and
wherein the metallization stack comprises a typically structured and optically transparent and electrically insulating layer 34, and
wherein at least a part of said typically structured, transparent and electrically insulating layer of surface 46 forms optical fiber 50, and
wherein the first SPAD diode 44 radiates from the semiconducting material of the semiconductor substrate into said optical fiber 50, and
wherein the optical fiber irradiates the second SPAD diode 44 in such a way that the light from inside the optical fiber 50 re-enters the semiconducting material of the semiconductor substrate from the surface and hits device parts of the second SPAD diode 44 there.

Item 8) The secure microcontroller 1 according to item 6) and/or 7),
wherein the at least one operating circuit at least temporarily supplies the at least one first SPAD diode 44 with electrical energy, and
wherein the at least one first SPAD diode 44 feeds photons into the at least one optical fiber 50 when supplied with sufficient electrical energy, and
wherein the at least one optical fiber 50 emits such photons to the second SPAD diode 45.

Item 9) The secure microcontroller 1 according to one or more of the proceeding items,
wherein a data interface of the one or more data interfaces is a wired automotive data bus interface, and
wherein the wired automotive data bus interface optionally comprises
a CAN data bus interface, and/or
a CAN FD data bus interface, and/or
a Flexray data bus interface, and/or
an PSI5 data bus interface, and/or
an DSI3 data bus interface, and/or
a LIN data bus interface, and/or
an Ethernet data bus interface, and/or
a MELIBUS data bus interface.

Item 10) The secure microcontroller 1 according to one or more of the proceeding items,
wherein a data interface of the one or more data interfaces is a wireless data bus interface, and
wherein the wireless data bus interface optionally comprises
a WLAN interface, and/or
a Bluetooth interface.

Item 11) The secure microcontroller 1 according to one or more of the proceeding items,
wherein a data interface of the one or more data interfaces is a wired data bus interface, and
wherein the wireless data bus interface optionally comprises
a KNX data bus interface, and/or
an EIB data bus interface, and/or
a DALI data bus interface, and/or
a PROFIBUS data bus interface.

Item 12) A device
wherein the device comprises an integrated circuit 4 with a first processor 10-1 and a non-volatile memory 16, and
wherein the device comprises a first memory,
wherein the non-volatile memory stores at least one security code, whereon the first memory stores data, and
wherein the data in the first memory is cryptographically protected in a first format, and
wherein the integrated circuit is configured to validate the data read from the first memory during a transfer of data from the first memory, and
wherein the device comprises a quantum random number generator 28, and
wherein the integrated circuit and the quantum random number generator 28 are manufactured in a semiconductor crystal, and
wherein the semiconductor crystal has a surface 46, and
wherein the semiconductor crystal comprises a semiconducting material below its surface 46, and
wherein the surface 46 of the semiconductor crystal comprises a metallization stack, and
wherein the metallization stack comprises a typically structured and optically transparent and electrically insulating layer 34, and
wherein at least a part of said typically structured, transparent and electrically insulating layer 34 of surface 46 forms optical fiber 50, and
wherein the first SPAD diode 44 radiates photons 47 from the semiconducting material of the semiconductor substrate into said optical fiber 50, and
wherein the at least one optical fiber 50 transports such photons 48 to the second SPAD diode 45, and
wherein the optical fiber 50 irradiates the second SPAD diode 45 in such a way that the light 49 from inside the optical fiber 50 re-enters the semiconducting material of the semiconductor substrate from surface 46 and hits device parts of the second SPAD diode 45, and
wherein the first SPAD diode 44 and the second SPAD diode 45 and the optical fiber 50 are part of the quantum random number generator 28.

Item 13) The device according to item 12),
wherein the device comprises at least one operating circuit, and
wherein the at least one operating circuit at least temporarily supplies the at least one first SPAD diode 44 with electrical energy, and
wherein the at least one first SPAD diode 44 feeds photons 47 into the at least one optical fiber 50 when supplied with sufficient electrical energy, and
wherein the at least one optical fiber 50 transports such photons 48 to the second SPAD diode 45, and
wherein the at least one optical fiber 50 emits such photons 49 to the second SPAD diode 45.

Item 14) The device according to item 13),
wherein the quantum random number generator 28 comprises at least the first SPAD diode 44 as a light source for an optical quantum signal, and
wherein the quantum random number generator 28 comprises at least the second SPAD diode 45 as a photodetector for the optical quantum signal, and
wherein the quantum random number generator 28 comprises at least one processing circuit, and
wherein the quantum random number generator 28 comprises at least optical fiber 50, and
wherein the at least one optical fiber 50 optically couples the at least one first SPAD diode 44 with the at least one second SPAD diode 45, and
wherein the operating circuit supplies the first SPAD diode 44 with electrical energy such that the first SPAD diode emits light 44, and
wherein the processing circuit detects the signal of the second SPAD diode 45 and forms the random number therefrom and provides the latter to data processor 10 or another device part.

Item 15) The device according to any one of items 12) to 14),
wherein the first memory is external to the integrated circuit, and
wherein the device comprises a second memory for storing data, and
wherein the first memory is external to the integrated circuit;
wherein the device is configured to
transfer data from the first memory via the integrated circuit to the second memory for access by the data processor from the second memory, and
wherein the integrated circuit is configured to
validate the data read from the first memory during a transfer of data from the first memory to the second memory using a security code stored in the non-volatile memory, and
if the data are validated, to apply cryptographic protection in a second format to the validated data using a security code stored in the non-volatile memory, and
store the data protected in the second format in the second memory.

Item 16) The device according to any one of items 12) to 15), wherein the first memory comprises a read-only memory.

Item 17) The device according to any one of items 15) to 16), wherein the second memory comprises a random access memory.

Item 18) The device according to any one of items 15) to 17), wherein the cryptographic protection applied to the data in the first memory is different from the cryptographic protection applied to the data in the second memory.

Item 19) The device according to any one of items 12) to 18),
wherein the integrated circuit includes a memory for storing data that are to be processed by the data processor, and
wherein the device is configured to store some data of the validated data set in the memory and the rest in the second memory.

Item 20) The device according to any one of items 15) to 19), wherein the first memory stores data in a first data format and the second memory is arranged such that is stores data in a second, different data format.

Item 21) The device according to item 20),
wherein the data stored in the first memory are protected by a first authentication technique, and
wherein the device is configured to protect the data in the second memory by a second, different authentication technique.

Item 22) The device according to any one of items 15) to 21),
wherein the data in the first memory are stored in at least one data set and the or each data set is cryptographically protected as a set, and
wherein the device is configured to store words or word groups of a validated data set in the second memory, wherein each word or word group is separately cryptographically protected.

Item 23) The device according to item 22) configured to read the words or words groups from the second memory, and validates the read words or words groups by using a security code stored in the non-volatile memory, and to process the read and validated word or word groups in the data processor.

Item 24) The device according to item 23), wherein the integrated circuit comprises a hash computer, and wherein the data processor and the hash computer are arranged such that they a) calculate a hash function for each word or each group of words depending on a security code stored in the non-volatile memory and store the hash in connection with the word or the group in the second memory, b) retrieve a stored word or a group from the second memory, recalculate a hash function for the retrieved word or the retrieved group by using the security code, and compare the newly calculated hash with the stored hash, and c) only allow the retrieved word or group to be processed by the data processing system if the newly calculated and stored hashes are in a certain relationship to each other.

Item 25) The device according to item 24), wherein the hash calculator is a circuit in the integrated circuit.

Item 26) The device according to any one of items 12) to 25), wherein the non-volatile memory of the integrated circuit is a one-time programmable memory.

Item 27) The device according to any one of items 12) to 26), wherein the or each data set stored in the first memory is cryptographically protected by a corresponding digital signature.

Item 28) The device according to any one of items 12) to 28), wherein the or each data set stored in the first memory is cryptographically protected by a corresponding digital signature with the aid of at least one random number of the quantum random number generator.

Item 29) The device according to item 27) or 28), wherein a security code is stored in the non-volatile memory of the integrated circuit, which security code has been generated by the device at least partially by means of at least one random number of the quantum random number generator (28).

Item 30) The device according to any one of items 27) to 29), wherein the device is configured to validate a digital signature of the data set by reference to a or the security code stored in the non-volatile memory of the integrated circuit.

Item 31) A data processing device, wherein the data processing device comprises an integrated circuit, and wherein the integrated circuit comprises a data processor, and wherein the integrated circuit comprises a non-volatile memory, and where the non-volatile memory stores at least one security code, and wherein the integrated circuit comprises a hash computer, and wherein the integrated circuit has an interface at the boundary of the integrated circuit, and wherein the integrated circuit comprises a quantum random number generator, and wherein the integrated circuit and the quantum random number generator are manufactured in a semiconductor crystal, and wherein the semiconductor crystal has a surface 46, and wherein the semiconductor crystal comprises a semiconducting material below its surface 46, and wherein the surface 46 of the semiconductor crystal comprises a metallization stack, and wherein the metallization stack comprises a typically structured and optically transparent and electrically insulating layer 34, and wherein at least a part of said typically structured, transparent and electrically insulating layer 34 of surface 36 forms optical fiber 50, and wherein the first SPAD diode 44 radiates photons 47 from the semiconducting material of the semiconductor substrate into said optical fiber 50, and wherein the at least one optical fiber 50 transports such photons 48 to the second SPAD diode 45, and wherein the optical fiber 50 irradiates the second SPAD diode 45 in such a way that the light 49 from inside the optical fiber 50 re-enters the semiconducting material of the semiconductor substrate from surface 46 and hits device parts of the second SPAD diode 45, and wherein the first SPAD diode 44 and the second SPAD diode 45 and the optical fiber 50 are part of the quantum random number generator 28.

Item 32) A data processing device according to item 31), wherein the data processor and/or another device part of the data processing device encrypts or decrypts data with the aid of at least one random number of the quantum random number generator.

Item 33) The data process device according to items 31) or 32), wherein the data processing device comprises a memory, and wherein the memory is adapted to store data when used by the processor; and wherein the memory is coupled to the data processor to receive words from the data processor and deliver words to the data processor.

Item 34) The data processing device according to any one of items 31) to 33), wherein the memory is external to the integrated circuit, and wherein the memory is coupled to the data processor via the interface at the boundary of the integrated circuit to receive words from the data processor and deliver words to the data processor.

Item 35) The data processing device according to any one of items 31) to 34), wherein the data processor and the hash computer are arranged such that they a) calculate a hash function for each word depending on a security code stored in the non-volatile memory and store the hash in connection with the word, b) retrieve stored words from memory, recalculate a hash function for each retrieved word using the security code, and compare the recalculated hash value with the stored hash value, and c) only permit the processing of the retrieved word by the data processing system if the newly calculated and stored hashes have a previously defined relationship.

Item 36) A device comprising the following:

an integrated circuit including a data processing means and a non-volatile memory means storing at least one security code;
a first means storing data, wherein the data is cryptographically protected in a first format by at least one authentication code; and
a quantum random number generator 28 as part of the integrated circuit,
wherein the quantum random number generator comprises a first SPAD diode 44 and a second SPAD diode 45 which are or can be coupled to each other via an optical fiber 50 fabricated outside the semiconductor substrate of the integrated circuit on the surface of the integrated circuit, and
wherein the device at least temporarily makes use of at least one random number of the quantum random number generator 28 for encrypting or decrypting a date or the authentication code.

Item 37) The device according to item 36),
wherein the device comprises a second apparatus, optionally external to the integrated circuit, for storing data, and
wherein the device comprises means for transferring data from the first memory via the integrated circuit to the second memory for access by the data processor from the second memory, and
wherein the device comprises means for validating the data read from the first memory during transfer by using a security code stored in the non-volatile memory, and
wherein the apparatus comprises means for applying cryptographic protection comprising at least one authentication code to the validated data in a second format using a security code stored in the non-volatile memory when the data is validated, and
wherein the device comprises means for storing the protected data in the second memory in the second format.

Item 38) The device, in particular according to any one of items 12) to 37),
wherein the device comprises a quantum random number generator 400, and
wherein the quantum random number generator comprises the following device parts:
a first SPAD diode 404.1,
a second SPAD diode 404.3,
an optical fiber 404.2 which optically couples the first SPAD diode 404.1 and the second SPAD diode 404.3 to one another,
an amplifier 403 and/or filter,
an analog-to-digital converter 403,
a comparator 404.2,
a time-to-digital converter 404.3,
an entropy extraction device 404.4 converting output values of the time-to-digital converter 403 into first and second values and generates random bits therefrom.

Item 39) The device according to item 27), wherein the device comprises a watchdog 404.5 that monitors device parts of the quantum random number generator 400.

Item 40) The device according to any one of items 38) and 39), wherein the device comprises a voltage monitor 413 that detects and monitors analog values of analog signals.

Item 41) The device according to any one of items 38) to 40), wherein the device comprises a pseudo-random number generator 404.6, optionally ion the form of a linear feedback shift register 404.6.

Item 42) The device according to any one of items 38) to 41), wherein the device comprises a signal multiplexer which, in the event of an error, switches from the signal of the output 411 of the entropy extraction device to a signal of an equivalent random number generator or an equivalent pseudo-random number generator 404.6.

Item 43) The device according to any one of items 38) to 42), wherein the start value of the pseudo-random number generator 404.6 in the event of an error depends on previously correctly generated random bits of the quantum random number generator 400.

Item 44) A method for generating a random bit comprising the steps of
generating a pulse sequence with random intervals by means of at least two SPAD diodes,
wherein the pulse sequence comprises pulses of a first height class 601 and a second height class 602;
separating the pulses of the first height class 601 from the pulses of the second height class 602 by means of a cutting level 603, 404.1;
detecting 501 a first value of the time interval between a first pulse of the second height class 602 and a second pulse of the second height class 602 different from the first pulse;
detecting 501 a second value of the time interval between a third pulse of the second height class 602 different from the first pulse and a fourth pulse of the second height class 602 different from the first pulse and from the second pulse and from the third pulse,
comparing 502 the first value with the second value, and
outputting 503 a first logical values as a random bit if the first value is larger than the second value, and
outputting 503 a second logical value different from the first logical value as the random bit if the first value is smaller than the second value.

Item 45) A method 3700 for generating a quantum random number QZ with m random bits comprising the following steps:
generating 3710 a random single photon current 47, 48, 49, 401.2 from single photons by means of one or more first SPAD diodes 401.1, 44;
transmitting 3720 the random single photon current 47, 48, 49, 401.2 by means of an optical fiber 50, 401.2 different from the semiconductor substrate 39, 38 to one or more second SPAD diodes 401.3, 45;
converting 3730 of the random single photon current 47, 48, 49, 401.2 into a detection signal by means of the one or more second SPAD diodes 401.3, 45;
conditioning 3740 the detection signal into a conditioned detection signal;
separating 3750 the pulses of the conditioned detection signal produced by coupling the emissions of a first SPAD diode 401.1 of the one or more first SPAD diodes 401.1, 44 and a second SPAD diode 401.3, 45 of the one or more second SPAD diodes 401.3, 45 from the pulses of the conditioned detection signal generated by spontaneous emission of the second SPAD diode 401.3, 45 by comparing the conditioned detection signal with a threshold value 404.1;
determining 3760 a first time interval between the first pulse and the second pulse of a first pair of two successive pulses of the conditioned detection signal produced by coupling the emissions of a first SPAD diode 401.1, 44 and a second SPAD diode 401.3, 45, and determining a second time interval between a third pulse and a fourth pulse of a second pair of two successive pulses of the conditioned detection signal produced by coupling the emissions of a first SPAD diode 401.1, 44 and a second SPAD diode 401.3, 45;

determining 3670 the bit value of a random bit by comparing the value of the first time interval and the value of the second time interval;

if the number 3680 $n$ of the determined random bits is smaller than the desired number m of the random bits of the quantum random number QZ to be generated, repeating the above steps 3710 to 3770 and terminating the process for generating a quantum random number if the number 3680 $n$ of the determined random bits is greater than or equal to the desired number m of the random bits of the quantum random number QZ to be generated.

Item 46) A device comprising the following:
an integrated circuit including a data processing means and a non-volatile memory means storing at least one security code;
a first means storing data, wherein the data is cryptographically protected in a first format by at least one authentication code; and
a quantum random number generator 28 as part of the integrated circuit,
wherein the quantum random number generator comprises a first SPAD diode 44 and a second SPAD diode 45 which are or can be coupled to each other via an optical fiber 50 fabricated outside the semiconductor substrate of the integrated circuit on the surface of the integrated circuit, and
wherein the device at least temporarily makes use of at least one random number of the quantum random number generator 28 for encrypting or decrypting a date or the authentication code.

Item 47) The device according to item 46,
wherein the device comprises a second apparatus, optionally external to the integrated circuit, for storing data, and
wherein the device comprises means for transferring data from the first memory via the integrated circuit to the second memory for access by the data processor from the second memory, and
wherein the device comprises means for validating the data read from the first memory during transfer by using a security code stored in the non-volatile memory, and
wherein the apparatus comprises means for applying cryptographic protection comprising at least one authentication code to the validated data in a second format using a security code stored in the non-volatile memory when the data is validated, and
wherein the device comprises means for storing the protected data in the second memory in the second format.

Item 48) The device according to item 46) or 47),
wherein the device comprises a quantum random number generator 400, and
wherein the quantum random number generator comprises the following device parts:
a first SPAD diode 404.1,
a second SPAD diode 404.3,
an optical fiber 404.2 which optically couples the first SPAD diode 404.1 and the second SPAD diode 404.3 to one another,
an amplifier 403 and/or filter,
an analog-to-digital converter 403,
a comparator 404.2,
a time-to-digital converter 404.3,
an entropy extraction device 404.4 converting output values of the time-to-digital converter 403 into first and second values and generates random bits for the random number therefrom.

Item 49) The device according to item 48), wherein the device comprises a watchdog 404.5 that monitors device parts of the quantum random number generator 400.

Item 50) The device according to any one of items 48) and 49), wherein the device comprises a voltage monitor 413 that detects and monitors analog values of analog signals.

Item 51) The device according to any one of items 48) to 50), wherein the device comprises a random number generator a pseudo-random number generator 404.6, optionally ion the form of a linear feedback shift register 404.6.

Item 52) The device according to any one of items 48) to 51), wherein the device comprises a signal multiplexer which, in the event of an error, switches from the signal of the output 411 of the entropy extraction device to a signal of an equivalent random number generator or an equivalent pseudo-random number generator 404.6.

Item 53) The device according to any one of items 48) to 52), wherein the start value of the pseudo-random number generator 404.6 in the event of an error depends on previously correctly generated random bits of the quantum random number generator 400.

Item 54) A method for generating a random bit comprising the steps of
generating a pulse sequence with random intervals by means of at least two SPAD diodes,
wherein the pulse sequence comprises pulses of a first height class 601 and a second height class 602;
separating the pulses of the first height class 601 from the pulses of the second height class 602 by means of a cutting level 603, 404.1;
detecting 501 a first value for the time interval between a first pulse of the second height class 602 and a second pulse of the second height class 602 different from the first pulse;
detecting 501 a second value for the time interval between a third pulse of the second height class 602 different from the first pulse and a fourth pulse of the second height class 602 different from the first pulse and from the second pulse and from the third pulse;
comparing 502 the first value with the second value, and
outputting 503 a first logical values as a random bit if the first value is larger than the second value, and
outputting 503 a second logical value different from the first logical value as the random bit if the first value is smaller than the second value.

Item 55) A method 3700 for generating a quantum random number QZ with m random bits comprising the following steps:
generating 3710 a random single photon current 47, 48, 49, 401.2 from single photons by means of one or more first SPAD diodes 401.1, 54;
transmitting 3720 the random single photon current 47, 48, 49, 401.2 by means of an optical fiber 50, 401.2 to one or more second SPAD diodes 401.3, 45;

converting 3730 of the random single photon current 47, 48, 49, 401.2 into a detection signal by means of the one or more second SPAD diodes 401.3, 45;

conditioning 3740 the detection signal into a conditioned detection signal;

separating 3750 the pulses of the conditioned detection signal produced by coupling the emissions of a first SPAD diode 401.1 of the one or more first SPAD diodes 401.1, 44 and a second SPAD diode 401.3, 45 of the one or more second SPAD diodes 401.3, 45 from the pulses of the conditioned detection signal generated by spontaneous emission of the second SPAD diode 401.3, 45 by comparing the conditioned detection signal with a threshold value 404.1;

determining 3760 a first time interval between the first pulse and the second pulse of a first pair of two successive pulses of the conditioned detection signal produced by coupling the emissions of a first SPAD diode 401.1, 44 and a second SPAD diode 401.3, 45, and determining a second time interval between a third pulse and a fourth pulse of a second pair of two successive pulses of the conditioned detection signal produced by coupling the emissions of a first SPAD diode 401.1, 44 and a second SPAD diode 401.3, 45;

determining 3670 the bit value of a random bit by comparing the value of the first time interval and the value of the second time interval;

if the number 3680 n of the determined random bits is smaller than the desired number m of the random bits of the quantum random number QZ to be generated, repeating the above steps 3710 to 3770 and terminating the process for generating a quantum random number if the number 3680 n of the determined random bits is greater than or equal to the desired number m of the random bits of the quantum random number QZ to be generated.

56) A device for generating a quantum random number QZ, comprising one or more first SPAD diodes 401.1, 44 generating an optically quantum process-based random single photon current 47, 48, 49, 401.2 from single photons 3710, and comprising one or more second SPAD diodes 401.3, 45, and comprising an optical fiber 50, 401.2 different from the semiconductor substrate 39, 38, which transmits the random single photon current 47, 48, 49, 401.2 to one or more second SPAD diodes 401.3, 45 3720, and wherein the one or more second SPAD diodes 401.3, 45 convert the random single photon current 47, 48, 49, 401.2 into a detection signal 3730, and wherein a signal processing device, optionally an amplifier 402, conditions the detections signals into a conditioned detections signal 3740, and wherein a comparators 404.02 or a functionally equivalent device separates 3750 the pulses of the conditioned detection signal produced by coupling the emissions of a first SPAD diode 401.1 of the one or more first SPAD diodes 401.1, 44 and a second SPAD diode 401.3, 45 of the one or more second SPAD diodes 401.3, 45 from the pulses of the conditioned detection signal generated by spontaneous emission of the second SPAD diode 401.3, 45 by comparing the conditioned detection signal with a threshold value 404.1, and wherein a time-to-digital converter 404.3 determines 3760 a first time interval between the first pulse and the second pulse of a first pair of two successive pulses of the conditioned detection signal produced by coupling the emissions of a first SPAD diode 401.1, 44 and a second SPAD diode 401.3, 45, and determining a second time interval between a third pulse and a fourth pulse of a second pair of two successive pulses of the conditioned detection signal produced by coupling the emissions of a first SPAD diode 401.1, 44 and a second SPAD diode 401.3, 45; and wherein an entropy extraction device 404.4 determines 3670 the bit value of a random bit by comparing the value of the first time interval and the value of the second time interval, and wherein a finite-state machine 404.8 generates a quantum random number QZ 417 from the bit data stream of random bits 411.

LIST OF REFERENCE NUMERALS 1 secure microcontroller
2 one or more internal data buses
3 one or more read/write memories RAM
4. one or more writable non-volatile memories; said non-volatile memories can comprise EEPROM memories or flash memories or OTP memories, for example
5 one or more non-volatile, read-only memories, such as a ROM
6 one or more non-volatile, writable and/or non-writable manufacturer memories; in the case on a non-writable manufacturer memory, the manufacturer memory can be a manufacturer ROM, for example
7 one or more cryptographic accelerators, for example a DES accelerator and/or an AES accelerator
8 one or more manufacturer memory firewalls
11 one or more CRC modules (cyclic redundancy check)
12 one or more clock generator modules (CLK)
13 timer modules
14 one or more safety monitoring and control circuits
15 quantum process-based generator
16 microcontroller core
17 data interface, optionally one or more universal asynchronous receiver transmitters (UART) to support high-speed serial data
21 one or more base clock generators (CLK)
22 one or more reset circuits
23 one or more power supply or Vcc circuits with voltage regulators that provide the operating voltages for the secure microcontroller
24 one or more ground circuits
25 one or more input/output circuits
30 exemplary SPAD diode for use as a sensor element of a single-photon detector
31 shallow trench isolation STI of the exemplary SPAD diode
32 anode contact of the exemplary SPAD diode
33 cathode contact of the exemplary SPAD diode; the cathode contact of the exemplary SPAD diode is preferably made of indium tin oxide (ITO) or another transparent and electrically conductive material
34 insulating layer
34' insulating layer
34" insulating layer
35 highly doped first connection area of a first line type; in a CMOS technology with a p-doped wafer material, for example, it can be an n⁺-doped area in the semiconducting substrate material of the SPAD diode
36 first doped tray of a second line type; in a CMOS technology with a p-doped wafer material, for example, it can be a weaker doped, i.e. p⁻-doped area in the semiconducting substrate material of the SPAD diode 1820
37 second doped tray of a second line type; in a CMOS technology with a p-doped wafer material, for example, it can be a weaker doped, i.e. p⁻-doped area in the semiconducting substrate material of the SPAD diode
38 epitaxial layer of a second line type; in a CMOS technology with a p-doped wafer material, for example, it can be a p-doped epitaxial layer in the semiconducting substrate material of the SPAD diode
39 base material of the semiconducting monocrystalline wafer, which has a second conductivity type; in a CMOS technology with a p-doped wafer material, for example, it is a p-doped monocrystalline semiconductor wafer
40 second doped tray of a second line type below the anode contact; in a CMOS technology with a p-doped wafer material, for example, it can be a p⁻-doped area in the semiconducting substrate material of the SPAD diode
41 highly doped second connection area of a second line type; in a CMOS technology with a p-doped wafer material, for example, it can be a p⁺-doped area in the semiconducting substrate material of the SPAD 1820 diode
42 insulation, for example an oxide or similar
43 metal cover of the optical fiber
44 first SPAD diode; the first SPAD diode serves at least temporarily as a light source for irradiating the second SPAD diode with photons from the first SPAD diode
45 second SPAD diode; the second SPAD diode serves, for example, at least temporarily as a photodetector for the light from the first SPAD diode
46 surface of wafer in line with the application submitted herein
47 light of the first SPAD diode emitted vertically upwards in a direction perpendicular to the surface
48 light transported horizontally in the optical fiber, which is part of the light emitted vertically into the optical fiber by the first SPAD diode
49 light of the first SPAD diode emitted vertically downwards in a direction perpendicular to the surface from the optical fiber into the second SPAD diode, which light was emitted by the first SPAD diode as a perpendicular light into the optical fiber and then transported horizontally from the optical fiber to the second SPAD diode;
50 optical fiber for transporting the photons from the first SPAD diode to the second SPAD diode; the optical fiber is formed from a covering oxide or another optically transparent insulating layer on the circuit of the exemplary SPAD diode.
50' optical fiber for transporting the photons from the first SPAD diode to the second SPAD diode; the optical fiber is formed from a covering oxide or another optically transparent insulating layer on the circuit of the exemplary SPAD diode or from two optically transparent insulating layers (e.g. the metallization stack) arranged on top of each other.
51 contacting
52 contacting
53 plane between two electrically insulating layers of the waveguide
400 quantum random number generator QRNG
40 entropy source
401.1 one or more first SPAD diodes
401.2 optical fiber
401.3 one or more second SPAD diodes
402 high-frequency amplifier
403 analog-to-digital converter (ADC)
404 measurement board with FPGA
404.1 constant
404.2 comparator
404.3 time-to-digital converter
404.4 entropy extraction device
404.5 watchdog
404.6 linear feedback shift register; the feedback is preferably a simple primitive polynomial to generate pseudo-random bit sequences;
404.7 signal multiplexer
404.8 finite-state machine
404.9 RAM
404.10 Finish Flag
404.11 microcontroller
405 voltage signal of the entropy source 401
406 amplifier output signal 406 of the high-frequency amplifier 402
407 digital 14-bit value 407 of the analog-to-digital converter 403; other bit widths are conceivable
408 signal of the constant 404.1
409 output signal 409 of the comparator 404.2
410 output 410 of the time-to-digital converter 404.3
411 output of the entropy extraction 404.4
412 seed S
413 voltage monitor
414 signal lines
416 selection signal
417 pseudo-random signal line
418 random data words
419 internal data bus of quantum random number generator 400; preferably, this is the internal data bus of control device 4
420 interrupt signal of watchdog 404.5 of quantum random number generator 400 and control device 4 of fuse 1, respectively
500 flow diagram 500 of entropy extraction method
501 first step 501 with determining the first value of the output 410 of the time-to-digital converter 404.3 and the second value of the output 410 of the time-to-digital converter 404.3 and storing in a shift register of the entropy extraction 404.4
502 second step of comparing the first value with the second value
503 third step of evaluating the first value and the second value and generating the random bit
601 first spikes
602 second spikes
603 cutting level
3700 method for generating a quantum random number QZ with m random bits
3710 generating a random single photon current (57, 58, 59, 401.2) by means of one or more first SPAD diodes (401.1, 54)
3720 transmitting the random single photon current (57, 58, 59, 401.2) by means of an optical fiber (44, 401.2) different from the semiconductor substrate (49, 48) to one or more second SPAD diodes (401.3, 55)

3730 converting the random single photon current (57, 58, 59, 401.2) into a detection signal in the form of a voltage signal 405 of the entropy source 401, which preferably comprises the first SPAD diodes 401.1 and the optical fiber 401.2 and the second SPAD diodes 401.3

3740 conditioning, optionally amplifying and/or filtering and/or analog-to-digital converting, of the detection signal into a conditioned detection signal, optionally a digital 14-bit value 407 of the analog-to-digital converter 403

3750 separating the pulses of the conditioned detection signal produced by coupling the emissions of a first SPAD diode 401.1 and a second SPAD diode 401.3 from the pulses of the conditioned detection signal produced by spontaneous emission by comparing the conditioned detection signal with a threshold value, optionally in a comparator 404.2, and generating a corresponding output signal 409, optionally of the comparator 404.2

3760 determining a first time interval between the first pulse and the second pulse of a first pair of two successive pulses of the conditioned detection signal produced by coupling the emissions of a first SPAD diode 401.1 and a second SPAD diode 401.3, and determining a second time interval between a third pulse and a fourth pulse of a second pair of two successive pulses of the conditioned detection signal produced by coupling the emissions of a first SPAD diode 401.1 and a second SPAD diode 401.3 and, optionally, to determine the first value of the output 410 of the time-to-digital converter 404.3 and the second value of the output 410 of the time-to-digital converter 404.3

3670 determining the bit value of a random bit by comparing the value of the first time interval and the value of the second time interval 3680 If the number n of random bits determined up to this step is smaller than the desired number m of random bits of the desired quantum random number, the above steps are repeated. Otherwise, the process is terminated to generate a quantum random number with m random bits.

The invention claimed is:

1. A secure microcontroller for controlling devices in an automobile, comprising:
a semiconductor substrate,
memory elements,
at least one internal bus,
at least one microcontroller core,
one or more data bus interfaces, and
at least one quantum process-based generator for true random numbers,
wherein the memory elements are connected to the at least one internal bus,
wherein the one or more data bus interfaces is connected to the at least one internal bus,
wherein the at least one quantum process-based generator is connected to the at least one internal bus,
wherein the at least one microcontroller core is connected to the at least one internal bus,
wherein the at least one quantum process-based generator generates a random number at a request of the at least one microcontroller core,
wherein the at least one quantum process-based generator provides said random number to the at least one microcontroller core,
wherein the at least one microcontroller core generates a key using a program from one or more of its memory elements and using the random number,
wherein the at least one microcontroller core uses the program from the one or more of its memory elements and the key to encrypt and decrypt data which it exchanges with external devices or internally via the one or more data bus interfaces,
wherein the semiconductor substrate integrally comprises sub-devices of the secure microcontroller mentioned herein,
wherein the at least one quantum process-based generator comprises at least one first SPAD (Single Photon Avalanche Diode) diode as a light source for an optical quantum signal,
wherein the at least one quantum process-based generator comprises at least one second SPAD diode as a photodetector for receiving the optical quantum signal,
wherein the at least one quantum process-based generator comprises at least one optical fiber for optically coupling the at least one first SPAD diode to the at least one second SPAD diode,
wherein the at least one quantum process-based generator comprises an operating circuit for supplying the at least one first SPAD diode with electric energy for emitting light, and
wherein the at least one quantum process-based generator comprises a processing circuit for detecting an output signal of the at least one second SPAD diode and for forming the random number from the output signal of the at least one second SPAD diode and providing the random number to the at least one microcontroller core,
wherein
the semiconductor substrate comprises a surface,
the semiconductor substrate comprises a semiconducting material below its surface,
the surface of the semiconductor substrate comprises a metallization stack,
the metallization stack comprises an optically transparent and electrically insulating layer which is located on the surface of the semiconductor substrate,
at least a part of the optically transparent and electrically insulating layer forms the at least one optical fiber,
the at least one first SPAD diode emits photons from the semiconducting material of the semiconductor substrate into the at least one optical fiber, and
the at least one optical fiber transports the photons to the at least one second SPAD diode.

2. The secure microcontroller according to claim 1, wherein an emission signal of the at least one second SPAD diode has first spikes and second spikes which are larger than the first spikes, wherein the first spikes and the second spikes are each larger than a predefinable reference value, wherein the first spikes arise due to a spontaneous photon emission of the at least one second SPAD diode without a simultaneously caused stimulated photon emission of the at least one second SPAD diode and the second spikes arise due to the simultaneously caused stimulated photon emission of the at least one second SPAD diode stimulated by a reception of a photon of the at least one first SPAD diode, and in that the processing circuit of the at least one quantum process-based generator generates a first logical value or a second logical value as a bit for generating the random number on a basis of a comparison of time intervals of the second spikes with a threshold value or on a basis of a comparison of the time intervals of the second spikes with one another.

3. The secure microcontroller according to claim 2, wherein the processing circuit generates the first logical value or the second logical value on a basis of a comparison of a time interval between two second spikes with the threshold value, and in that the processing circuit outputs the first logical value as a bit of the random number if the time interval is smaller than the threshold value, and outputs the second logical value as a bit of the random number if the time interval is greater than the threshold value.

4. The secure microcontroller according to claim 2, wherein the processing circuit generates the first logical value or the second logical value based on a comparison of respective time intervals of the second spikes of different pairs of second spikes, and in that the processing circuit outputs the first logical value as a bit for generating the random number if a time interval of a most recently occurring second spike is smaller than a time interval between a penultimate second spike and an antepenultimate second spike or another pair of previous second spikes, and outputs the second logical value as a bit for generating the random number if the time interval of the most recently occurred second spike is greater than the time interval between the penultimate second spike and the antepenultimate second spike or the other pair of previous second spikes.

5. The secure microcontroller according to claim 2, including at least two pairs of a first SPAD diode and a second SPAD diode, wherein respective emissions signals of each of the second SPAD diodes are feedable to the processing circuit and the processing circuit outputs different individual bits for generating the random number based on the respective emission signals of each second SPAD diode.

6. The secure microcontroller according to claim 2, including a single pair of a first SPAD diode and a second SPAD diode, wherein the processing circuit sequentially outputs the first logical value or the second logical value as a bit for generating the random number.

7. The secure microcontroller according to claim 2, including a single first SPAD diode and at least two second SPAD diodes optically coupled to the single SPAD diode, wherein respective emission signals of each of the second SPAD diodes are feedable to the processing circuit and the processing circuit outputs different individual bits for generating the random number based on the respective emission signals of each second SPAD diode.

8. The secure microcontroller according to claim 2, including an error detection unit, wherein the error detection unit further includes at least one of a watchdog and a voltage monitor, and a pseudo-random number generator, wherein the processing circuit of the at least one quantum process-based generator switches from outputting bits for generating the random number based on the emission signal of the at least one second SPAD diode to outputting bits generated by the pseudo-random number generator for generating a pseudo-random number, when the error detection unit detects at least one of a first error in a function of components responsible for optical quantum process-based process of the at least one quantum process-based generator or a second error of the processing circuit thereof.

9. The secure microcontroller according to claim 8, wherein the error detection unit outputs an error signal representing a type and/or a cause of at least one of the first error or the second error when the at least one of the first error or the second error is detected.

10. The secure microcontroller according to claim 1, wherein the memory elements consist of at least one or more of one or more read/write memories RAM (Random Access Memory) or one or more writable non-volatile memories, or flash memories or one time programmable (OTP) memories, or one or more read-only memories or one or more non-volatile manufacturer ROMs (Read Only Memory), or one or more manufacturer EEPROMs (Electrically Erasable Programmable Read-Only Memory) or one or more manufacturer flash memories.

11. The secure microcontroller according to claim 10, wherein a non-volatile manufacturer ROM of the one or more non-volatile manufacturer ROMs comprises a boot software.

12. The secure microcontroller according to claim 1, including a manufacturer firewall provided between a manufacturer memory and the at least one internal bus.

13. The secure microcontroller according to claim 1, further comprising one or more digital components.

14. The secure microcontroller according to claim 1, wherein the at least one optical fiber irradiates the at least one second SPAD diode in such a way that the light from inside the at least one optical fiber re-enters the semiconducting material of the semiconductor substrate and hits device parts of the at least one second SPAD diode there.

15. The secure microcontroller according to claim 1, wherein:
the operating circuit at least temporarily supplies the at least one first SPAD diode with electrical energy,
the at least one first SPAD diode feeds the photons into the at least one optical fiber when supplied with sufficient electrical energy,
the at least one optical fiber transports the photons to the at least one second SPAD diode, and
the at least one optical fiber emits the photons to the at least one second SPAD diode.

16. The secure microcontroller according to claim 1, wherein the one or more data bus interfaces are wired automotive data bus interfaces.

17. The secure microcontroller according to claim 16, wherein the wired automotive data bus interfaces consist of one or more of:
a CAN (Controller Area Network) data bus interface, or
a CAN FD (Controller Area Network Flexible Data-Rate) data bus interface, or
a Flexray data bus interface, or
an PSI5 (Peripheral Sensor Interface 5) data bus interface, or
an DSI3 (Distributed System Interface, 3rd Generation) data bus interface, or
a LIN (Local Interconnect Network) data bus interface, or
an Ethernet data bus interface, or
a MELIBUS (Modular Embedded Local Interconnect BUS) data bus interface.

18. The secure microcontroller according to claim 1, wherein the one or more data bus interfaces are wireless data bus interfaces.

19. The secure microcontroller according to claim 18, wherein the wireless data bus interfaces consist of one or more of:
a WLAN (Wireless Local Area Network) interface, or
a mobile radio interface, or
a Bluetooth interface.

20. The secure microcontroller according to claim 1, wherein the one or more data bus interfaces are wired data bus interfaces.

21. The secure microcontroller according to claim 20, wherein the wired data bus interfaces consist of one or more of:
a KNX (Konnex) data bus interface, or
an EIB (European Installation Bus) data bus interface, or a DALI (Digital Addressable Lighting Interface) data bus interface, or a PROFIBUS (Process Field Bus) data bus interface.

22. The secure microcontroller according to claim 1, further comprising one or more analog components.

23. The secure microcontroller according to claim 1, further comprising one or more processing module in communication with the at least one internal bus.

* * * * *